(12) United States Patent
Drysdale et al.

(10) Patent No.: US 8,291,651 B2
(45) Date of Patent: Oct. 23, 2012

(54) STABLE UNBONDED FIBER-REINFORCED ELASTOMERIC SEISMIC ISOLATORS FOR BASE ISOLATION SYSTEM

(75) Inventors: Robert G. Drysdale, Ancaster (CA); Michael Tait, Dundas (CA); Hamid Toopchinezhad, Hamilton (CA)

(73) Assignee: TDT Ontario Inc., Dundas, Ontario (CA)

(*) Notice: Subject to any disclaimer, the term of this patent is extended or adjusted under 35 U.S.C. 154(b) by 0 days.

(21) Appl. No.: 12/663,143

(22) PCT Filed: Jun. 6, 2008

(86) PCT No.: PCT/CA2008/001077
§ 371 (c)(1),
(2), (4) Date: Feb. 23, 2010

(87) PCT Pub. No.: WO2008/148203
PCT Pub. Date: Dec. 11, 2008

(65) Prior Publication Data
US 2010/0162640 A1    Jul. 1, 2010

Related U.S. Application Data

(60) Provisional application No. 60/933,638, filed on Jun. 6, 2007.

(51) Int. Cl.
*E04B 1/98* (2006.01)
*E04H 9/02* (2006.01)

(52) U.S. Cl. ........... 52/167.8; 52/167.7; 52/1; 52/169.1; 52/167.1

(58) Field of Classification Search ............... 52/167.7, 52/167.8, 167.2, 167.4, 167.5, 167.6, 1, 169.1, 52/169.9, 169.8
See application file for complete search history.

(56) References Cited

U.S. PATENT DOCUMENTS

| 3,544,415 | A |   | 12/1970 | Price et al. |
| 3,924,907 | A | * | 12/1975 | Czernik et al. .................. 384/36 |
| 4,121,393 | A | * | 10/1978 | Renault et al. ............... 52/167.7 |
| 4,499,694 | A | * |  2/1985 | Buckle et al. ................ 52/167.7 |
| 4,527,365 | A | * |  7/1985 | Yoshizawa et al. .......... 52/167.8 |
| 4,593,502 | A | * |  6/1986 | Buckle .......................... 52/167.7 |
| 4,648,554 | A | * |  3/1987 | McQueen ..................... 238/283 |
| 4,695,169 | A |   |  9/1987 | Baigent |
| 4,887,788 | A |   | 12/1989 | Fischer et al. |
| 4,899,323 | A | * |  2/1990 | Fukahori et al. ............. 367/176 |
| 5,014,474 | A |   |  5/1991 | Fyfe et al. |
| 5,076,410 | A | * | 12/1991 | Maycock et al. ......... 192/107 R |

(Continued)

FOREIGN PATENT DOCUMENTS

| CA |     958162      | 11/1974 |
| WO | WO 00/29683     |  5/2000 |
| WO | WO 2006/020261 A2 |  2/2006 |
| WO | WO 2008/098982 A2 |  8/2008 |

OTHER PUBLICATIONS

International Search Report mailed Oct. 20, 2008 in related International Application No. PCT/CA2008/001077 (3 pages).

(Continued)

*Primary Examiner* — Mark Wendell
(74) *Attorney, Agent, or Firm* — Lucas & Mercanti LLP; Robert P. Michal

(57) ABSTRACT

An elastomeric seismic isolator bearing comprising a plurality of elastomeric layers reinforced with a plurality of fiber layers is disclosed, wherein said bearing is capable of exhibiting stable rollover when subjected to a lateral load in an unbonded application.

29 Claims, 18 Drawing Sheets

U.S. PATENT DOCUMENTS

| | | | |
|---|---|---|---|
| 5,233,800 | A | 8/1993 | Sasaki et al. |
| 5,438,806 | A | 8/1995 | Reinhall |
| 5,904,010 | A * | 5/1999 | Javid et al. .................... 52/167.7 |
| 6,085,472 | A * | 7/2000 | Malhotra ...................... 52/167.4 |
| 6,192,649 | B1 * | 2/2001 | Karim-Panahi et al. ... 52/741.15 |
| 2003/0205004 | A1 * | 11/2003 | Shreiner ............................ 52/66 |
| 2004/0123530 | A1 * | 7/2004 | Dorfmann .................... 52/167.1 |
| 2008/0136021 | A1 * | 6/2008 | Yang .............................. 257/737 |

OTHER PUBLICATIONS

Written Opinion of the International Searching Authority dated Oct. 14, 2008 in related PCT International Application No. PCT/CA2008/001077 (4 pages).

James M. Kelly, "Analysis of Fiber-Reinforced Elastomeric Insolators," *Journal of Seismology and Earthquake Engineering (JSEE)*, vol. 2, No. 1, Fall, 1999, pp. 19-34 (16 pages).

James M. Kelly, "Seismic Isolation Systems for Developing Countries," *Earthquake Spectra*, vol. 18, No. 3, pp. 385-406, Aug. 2002, Earthquake Engineering Research Institute (22 pages).

Byung-Young Moon, et al., "Mechanical Property Analysis and Design of Shock Absorber System Using Fiber Bearing by Experimental Method," *JSME International Journal*, Series C, vol. 46, No. 1, 2003, pp. 289-296 (8 pages).

Paul Summers, et al., "Development of New Base Isolation Devices for Application At Refineries and Petrochemical Facilities," 13th World Conference on Earthquake Engineering, Vancouver, B.C., Canada, Aug. 1-6, 2004, Paper No. 1036 (15 pages).

* cited by examiner

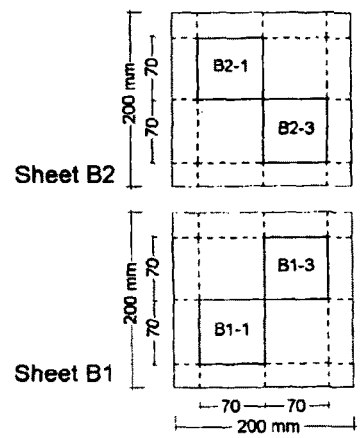
Fig. 11
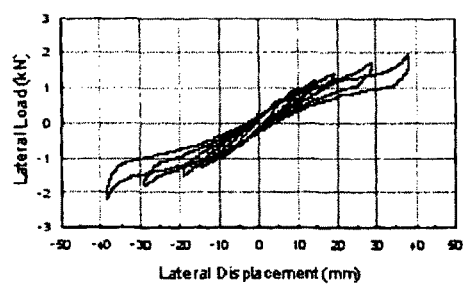 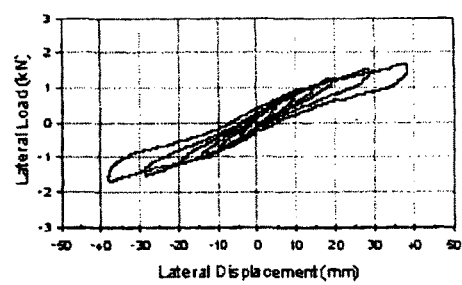
Fig. 12 a					Fig. 12b

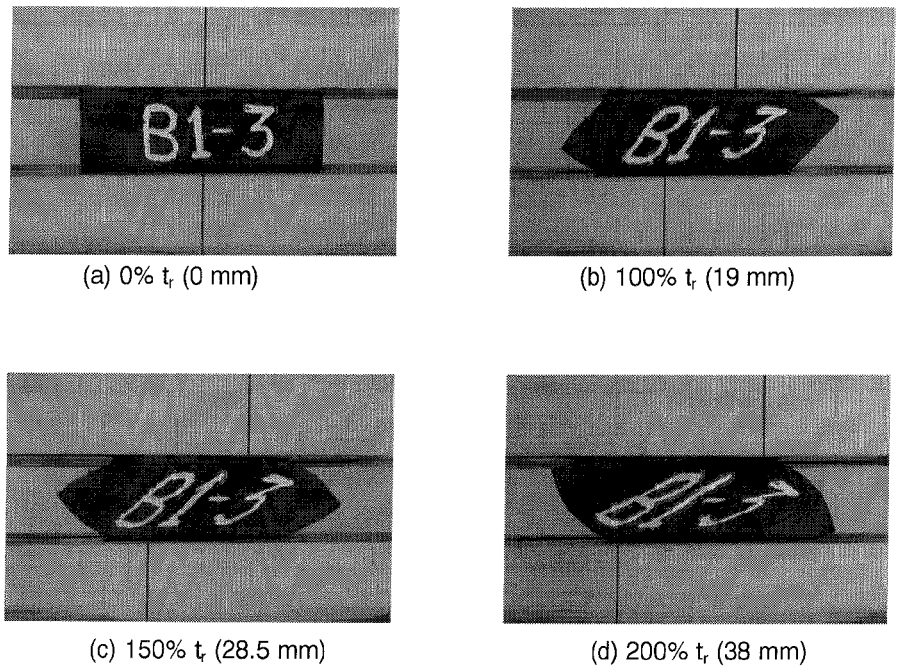
(a) 0% $t_r$ (0 mm)  (b) 100% $t_r$ (19 mm)
(c) 150% $t_r$ (28.5 mm)  (d) 200% $t_r$ (38 mm)
Fig. 15
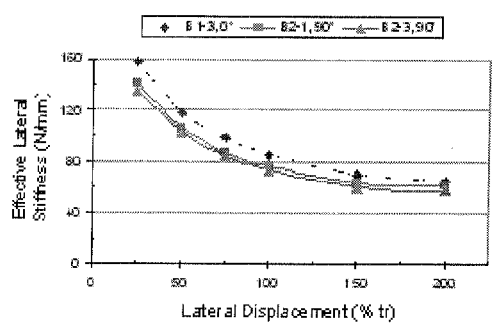
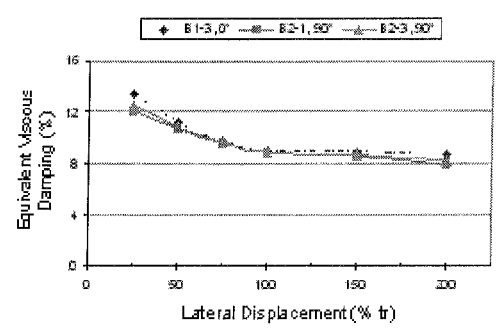
Fig. 16 a  Fig. 16 b

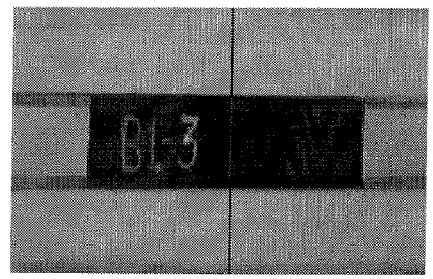
(a) 0% tr (0 mm)
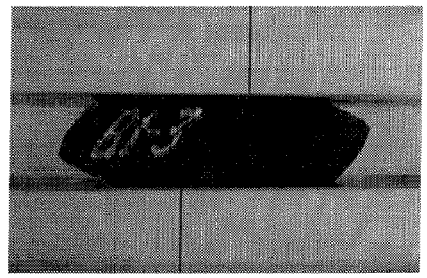
(b) 100% tr (19 mm)
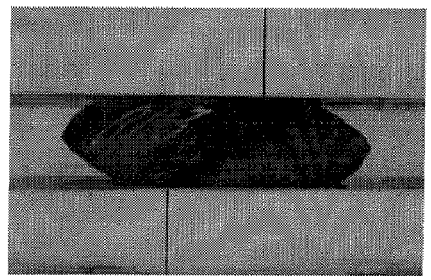
(c) 150% tr (28.5 mm)
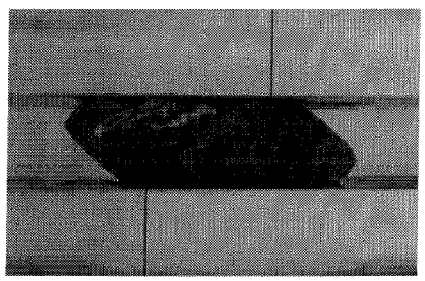
(d) 200% tr (38 mm)
Fig. 17
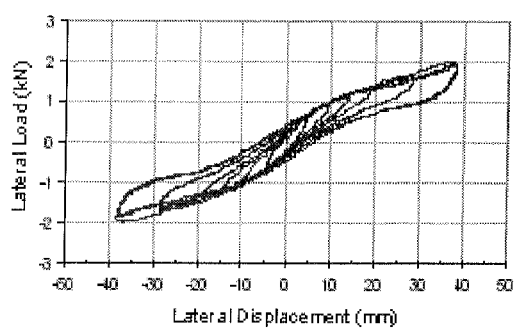
Fig. 18 a
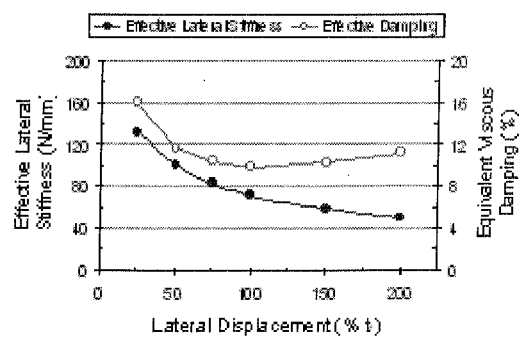
Fig. 18 b

(a) Start (0% tr)

(b) 200% $t_r$ (38 mm) - cycle 3

(c) 250% $t_r$ (47.5 mm) - cycle 3

(d) 300% $t_r$ (57 mm) - cycle 1

(e) 300% $t_r$ (57 mm) - cycle 3

(f) End (0% tr)

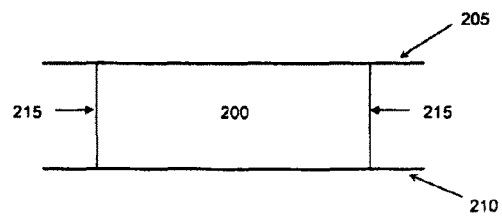
Fig. 29 a
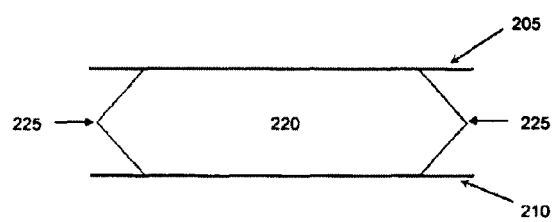 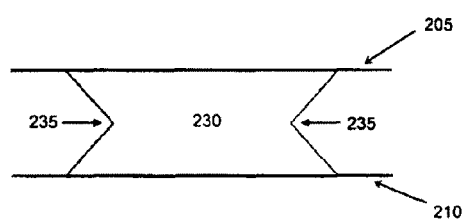
Fig. 29 b          Fig. 29 c
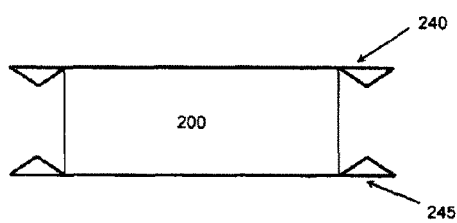 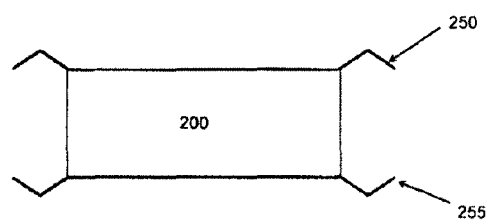
Fig. 29 d          Fig. 29 e
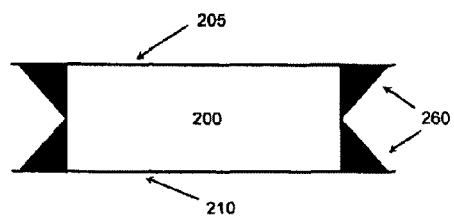 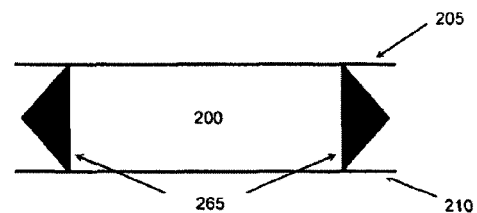
Fig. 29 f          Fig. 29 g

STABLE UNBONDED FIBER-REINFORCED ELASTOMERIC SEISMIC ISOLATORS FOR BASE ISOLATION SYSTEM

CROSS-REFERENCE TO RELATED APPLICATIONS

This is a National Phase Application of International Application PCT/CA2008/001077 filed Jun. 6, 2008, which in turn claims priority from U.S. Provisional Patent Application Ser. No. 60/933,638 filed Jun. 6, 2007, the entire contents of each of which are incorporated herein by reference.

FIELD OF THE INVENTION

This invention relates to fiber reinforced elastomeric isolator bearings for use in structural systems including low to medium rise buildings, bridges and other structures. In particular, this invention relates to unbonded bearings which demonstrate stable rollover deformation.

BACKGROUND OF THE INVENTION

Studies of past earthquakes have indicated that major loss of life often occurs due to collapse of poorly constructed housing. Conventional earthquake-resistant design of structures has been substantially improved over the last few decades. However, in many countries, the engineering services including design, construction, and inspection allocated to small and low rise private buildings and other structures may not be sufficiently comprehensive to provide an adequate level of structural safety against strong or even moderate earthquake events. If the level of seismic demand, imposed on these buildings, was reduced through a simple but reliable base isolation technique, this would result in fewer building failures and less loss of life.

Steel Reinforced Elastomeric Isolator (SREI) bearings are currently the most widely used isolators. However, as a result of being heavy and high priced, their application has generally been limited to large and expensive structures. Fiber Reinforced Elastomeric Isolators (FREIs) employ fibers rather than steel plates, as the reinforcement sheet. FREI bearings can provide adequate levels of vertical and horizontal stiffnesses as required in a base isolation device. Furthermore, unique aspects such as potentially low manufacturing cost, higher energy dissipation capability, light-weight, and, the possibility of being produced in long rectangular strips and being cut to size as required, provides promising advantages for this type of bearing.

Kelly (1999, Analysis of Fiber-Reinforced Elastomeric Isolators, *Journal of Seismology and Earthquake Engineering* (JSEE), 2 (1), 19-34) conducted an experimental study on cylindrical handmade bearings consisting of high damped rubber reinforced with Kevlar™ fibers. From the test results, it was revealed that fiber reinforcement can provide acceptable compression stiffness. Additionally, lack of flexural rigidity of reinforcement was shown to have a small effect on the horizontal stiffness of the bearing. The generated hysteresis loops under combined compression and shear showed the same general characteristics as a traditional SREI bearing with a stable behavior up to a peak shear strain of 150%. Furthermore, damping ratios higher than anticipated were obtained which revealed a new source of energy dissipation. This was an unexpected advantage of using fiber as reinforcement in elastomeric bearings.

Seven rectangular carbon-FREIs were tested by Kelly (2002, Seismic Isolation Systems for Developing Countries, *Earthquake Spectra*, 18 (3), 385-406) under both a compression load to measure the compression stiffness and a combination of compression and shear loading to measure the horizontal stiffness and effective damping. For the latter case, the test was repeated for orientations of 0, 90, and 45 degrees with respect to the longitudinal direction of the strip. It was observed that loading along 0 degree produces stiffening in the hysteresis loops, whereas along 90 degrees (i.e., the cross direction) softening behavior tends to occur. Loading along 45 degree produced neither softening nor stiffening. Experimental results confirmed that it is possible to produce a strip FREI that matches the behavior of a SREI. The measured horizontal stiffnesses and the maximum accommodated displacement indicated that the concept of carbon strip-FREI is viable.

Moon et al. (2003, Mechanical Property Analysis and Design of Shock Absorber System Using Fiber Bearing by Experimental Method, *JSME International Journal*, 46 (1), 289-296) compared the performance of a cylindrical carbon-FREI to that of the same size SREI. The difference between the steel plate and the fiber thickness was adjusted by using more layers of fiber and rubber in the FREI. Accordingly, bulging of the FREI was smaller than that of the SREI due to the thinner layers of rubber in the FREI. Unlike previous studies by Kelly where the bearings were built without end plates and were not bonded to the test machine during the test, both bearings were bonded to thick end plates. The researchers concluded that the performance of the FREI is superior to that of the SREI. However, due to insufficient information regarding the details of the tested isolators, the basis of comparison is not clearly identified. Accordingly, comparative studies between FREIs and SREIs still need to be conducted.

Summers et al. (2004, Development of new base isolation devices for application at refineries and petrochemical facilities, 13$^{th}$ *World Conference on Earthquake Engineering Vancouver, B.C., Canada*, August 1-6, Paper No. 1036) conducted an experimental study on prototype rectangular carbon FREIs as a potential seismic protection strategy for liquid storage tanks. The bearings consisted of high damped rubber compound and were subjected to a maximum 100% shear deformation under constant vertical compression. The resulting hysteresis loops showed stable behavior.

FREI bearing or isolation pads are used in both new and retrofit construction to provide vibration damping for residential and commercial properties and prevent structural collapse during seismic events. Various FREI bearings are disclosed in prior art issued patents and published patent applications.

US Patent Publication No. 2004/0123530 describes a system for protecting a structure from seismic ground motion comprising a horizontal bearing surface and damping elements consisting of unreinforced rubber slabs and fiber-reinforced elastomeric mats. Each mat consists of a piece of a rubber mat reinforced with fibers extending parallel to the surfaces of the mat. The horizontal bearing surface is covered with several layers of the damping elements.

U.S. Pat. No. 5,014,474 describes an apparatus for limiting the effect of vibrations between a structure and its foundation having two types of elastomeric load bearing pads. One pad absorbs vertically and horizontally applied forces. The other pad can accommodate sliding motion between the structure and the foundation and can absorb horizontally applied forces.

U.S. Pat. No. 5,904,010 describes a fiber reinforced elastomeric seismic isolation bearing. The bearing is a laminate block of material with alternating layers of elastomer and woven fiber mesh having fibers 0.1 to 1 mm made of graphite or a polyamide polymer, such as Kevlar™. This patent however describes bearings with vulcanized layers and pretensioned fibers.

U.S. Pat. No. 4,695,169 illustrates a structural bearing made with an elastomeric core imbedded with a matrix of twisted Kevlar™ cord. Rollover is not disclosed in this patent.

U.S. Pat. No. 4,593,502 describes a rectangular energy absorber constructed from layers of resilient materials and stiffening materials. The energy absorber also includes a steel spring and a lead core. The absorber can also be constructed with alternating layers of resilient and stiffener material. The layers described in this patent are not vulcanized and the fibers are not pretensioned. Rollover performance is not disclosed in this patent.

U.S. Pat. No. 4,887,788 describes the general state of the art as a base isolation pad to absorb energy. The disclosed device is made of an elastomeric material with a flexible reinforced tubular restraining shell.

U.S. Pat. No. 5,233,800 describes an earthquake proofing device designed to dampen the effects of seismic activity. The pads of this device incorporate laminated layers of synthetic rubber with specific characteristics and rigid plates made from wire.

U.S. Pat. No. 5,438,806 describes a composition for designing a device for vibration damping of released energy. The device consists of a number of configurations of elastomeric layers containing air or fluid voids.

The bearings of the prior art consider the rollover effect as an undesirable parameter which decreases stability.

There remains a need to provide a base isolation system which is intended for cost effective seismic mitigation of structures such as small and medium low-rise buildings and bridges. Such a system would require FREI bearings in an unbonded application, which demonstrate increased stability with stable rollover deformation.

SUMMARY OF THE INVENTION

The present invention addresses the above drawbacks by providing a cost-effective base isolation system for seismic mitigation of structures such as small and medium low-rise buildings and bridges. Such a system utilizes FREI bearings in an unbonded application, while demonstrating increased stability with stable rollover deformation.

In one aspect of the present invention, there is provided an elastomeric seismic isolator bearing comprising a plurality of elastomeric layers reinforced with a plurality of fiber layers, wherein the bearing is capable of exhibiting stable rollover when subjected to a lateral load in an unbonded application.

The elastomeric layers comprise one or more filled or unfilled elastomers; with the elastomer preferably having a hardness of between 30-60 Durometer Shore A; and preferably have a damping of between 2% to 20%. The elastomer is preferably selected from the group consisting of, natural gum rubber, neoprene, butyl rubber and urethanes.

The plurality of fiber layers comprise a bi-directional Fabric, a tri-directional fabric or alternating unidirectional fabrics with perpendicular orientation. In addition, the fiber layers comprise woven carbon fiber, nylon, Kevlar™ (a para-aramid synthetic fiber) or aramid fiber. The fiber layers have a fiber to matrix volume fraction of preferably between 30% to 70%.

A hot vulcanization process, cold vulcanization process, adhesive or other mechanical bonding can be used to bond one or more of the elastomeric layers to one or more of the fiber layers. The bearing has a shape factor of preferably between 5 to 25, and an aspect ratio of at least 2. In addition, the bearing has a fiber to elastomer volume fraction of at least 5%.

The bearing can have one or more modified vertical faces, or have one or more vertical faces fitted with a preformed attachment. Alternatively, contact surfaces above and below the bearing can each have a modified shape.

For seismic mitigation of structures, the bearing of the present invention has a seismic isolation period of at least 1 second.

In another aspect of the present invention, there is provided an elastomeric seismic isolator bearing comprising a plurality of natural gum rubber layers interspersed with a plurality of bi-directional carbon fiber layers, wherein said bearing is utilized in an unbonded application and is capable of exhibiting stable rollover when subjected to a lateral load.

One or more of the natural gum rubber layers is bonded to one or more of the bi-directional carbon fiber layers using mechanical bonding. The bearing has a shape factor of preferably between 5 to 25; an aspect ratio, also known as a second shape factor, of at least 2; and a fiber to elastomer volume fraction of at least 5%. In addition, the bearing has a seismic isolation period of at least 1 second. The elastomeric seismic isolator bearing is used for seismic mitigation of a structure with a fixed base period of between 0.1 to 0.5 seconds.

In yet another aspect of the present invention, there is provided an elastomeric seismic isolator bearing comprising a plurality of neoprene layers interspersed with a plurality of bi-directional carbon fiber layers, wherein said bearing is utilized in an unbonded application and is capable of exhibiting stable rollover when subjected to a lateral load.

One or more of the neoprene layers is bonded to one or more of the bi-directional carbon fiber layers using an adhesive or other mechanic bonding. The bearing has a shape factor of preferably between 5 to 25; an aspect ratio of at least 2; and a fiber to elastomer volume fraction of at least 5%. In addition, the bearing has a seismic isolation period of at least 1 second. The elastomeric seismic isolator bearing is used for seismic mitigation of a structure with a fixed base period of between 0.1 to 0.5 seconds.

In yet one more aspect of the present invention, there is provided a method for seismic mitigation of a structure comprising: placing a plurality of elastomeric seismic isolator bearings between the structure and a foundation of the structure; the bearing comprising a plurality of elastomeric layers reinforced with a plurality of fiber layers, wherein the bearing is not bonded to the structure and is capable of exhibiting stable rollover when subjected to a lateral load.

The elastomeric seismic isolator bearing has a seismic isolation period of at least 1 second and the structure has a fixed base period of between 0.1 to 0.5 seconds.

The elastomeric layers comprise one or more unfilled or filled elastomers; with the elastomer preferably having a hardness of between 30-60 Durometer Shore A; and preferably have a damping of between 2% to 20%. The elastomer is preferably selected from the group consisting of natural gum rubber, neoprene, butyl rubber and urethanes.

The plurality of fiber layers comprise a bi-directional fabric, a tri-directional fabric or alternating unidirectional fabrics with perpendicular orientation. In addition, the fiber layers comprise woven carbon fiber, nylon, para-aramid synthetic fiber or aramid fiber. The fiber layers have a fiber to matrix volume fraction of preferably between 30% to 70%.

A hot vulcanization process, cold vulcanization process, adhesive or other mechanical bonding. can be used to bond one or more of the elastomeric layers bonded to one or more of the fiber layers. The bearing has a shape factor of preferably between 5 to 25, and an aspect ratio of at least 2. In addition, the bearing has a fiber to elastomer volume fraction of at least 5%.

The bearing can have one or more modified vertical faces, or have one or more vertical faces fitted with a preformed attachment. Alternatively, contact surfaces above and below the bearing can each have a modified shape.

While the present invention is suitable for seismic mitigation, it is also applicable for non-seismic events. In addition, a worker skilled in the art would appreciate that all elastomers that demonstrate stable rollover deformation in the described conditions and which are suitable for use as bearings may be used in the present invention.

BRIEF DESCRIPTION OF THE DRAWINGS

FIG. 1a is a side view. FIGS. 1b and 1c are sectional views 1-1 and 2-2, respectively, from FIG. 1a.

FIG. 4a shows the bearing NB1 (aspect ratio $R_{NB1}=2.5$, and $t_{r,NB1}=70.5$ mm), and FIG. 4b shows the bearing NB2 (aspect ratio $R_{NB2}=2.9$, $t_{r,NB2}=61.1$ mm).

FIG. 5a shows an elevated view and FIG. 5b shows a sectional view along A-A of FIG. 5a. Solid rectangles in FIG. 5a and solid squares in FIG. 5b represent the carbon-FREI bearings.

FIG. 8a depicts the lateral displacement at isolators level and FIG. 8b depicts the isolated building period.

FIG. 9a depicts accelerations at the first floor and FIG. 9b depicts accelerations at the roof.

FIG. 10a depicts the base shear and FIG. 10b depicts the inter-storey drift at $2^{nd}$ storey.

FIG. 11 shows a sketch of seismic isolator sheets B1 & B2.

FIG. 12 shows hysteresis loops corresponding to the final cycle of lateral displacement at each displacement amplitude (lateral displ. ranges: 25%, 50%, 75%, 100%, 150%, and 200%; $t_r$; displ. rate=30 mm/s). FIG. 12a is of Bearing B2-1 and shows parallel response, and FIG. 12b is of Bearing B1-1 and shows diagonal response.

FIG. 13a shows a reduction in effective stiffness and FIG. 13b shows a reduction in effective damping.

FIG. 14a is for input signal at 6 ascending displacement amplitudes, FIG. 14b shows hysteresis loops of Bearing B1-3 for all cycles, FIG. 14c is for input signal at 6 descending displacement amplitudes, and FIG. 14d shows hysteresis loops of Bearing B2-3 for all cycles.

FIG. 15 shows photographs taken from parallel (0°) response of Bearing B1-3 at different amplitudes of lateral displacement; (a) 0% $t_r$ (0 mm), (b) 100% $t_r$ (19 mm), (c) 150% $t_r$ (28.5 mm), (d) 200% $t_r$ (38 mm).

FIG. 16 shows the lateral response values for Bearings B1-3 (at 0°), B2-1 (at 90°), and B2-3 (at 90°). Response values represent the average of all 3 cycles at each displacement amplitude. FIG. 16a shows the effective stiffness and FIG. 16b shows the effective damping.

FIG. 17 shows photographs taken of diagonal (45°) response of Bearing B1-3 at different amplitudes of lateral displacement; (a) 0% $t_r$ (0 mm), (b) 100% $t_r$ (19 mm), (c) 150% $t_r$ (28.5 mm), (d) 200% $t_r$ (38 mm).

FIG. 18 shows the lateral response characteristics of Bearings B1-3 at 45° orientation. Response values in FIG. 10(b) represent the average values at each displacement amplitude. FIG. 18a show hysteresis loops for all cycles and FIG. 18b shows response variations with displacement amplitude.

FIG. 19a shows an ascending amplitude pattern and FIG. 19b shows a descending amplitude pattern.

FIG. 20a depicts the variation in effective horizontal stiffness and FIG. 20b depicts the variation in effective damping.

FIG. 22a shows the stress-strain plot and FIG. 22b shows the effective compressive modulus representation.

FIG. 23a shows the effective horizontal stiffness and FIG. 23b shows the effective damping.

FIG. 24a is at 0° Response and FIG. 24b is at 90° Response.

FIG. 25a shows the half-cycle stable (scragged) loops of the virgin bearing versus the retested bearing, for lateral displacement ranges: 100%, 150%, and 200% $t_r$, and FIG. 25b shows the average response variations in the retested bearing with respect to the virgin bearing.

FIG. 27a depicts the Start (0% $t_r$), FIG. 27b is at 200% $t_r$ (38 mm)—cycle 3, FIG. 27c is at 250% $t_r$ (47.5 mm)—cycle 3, FIG. 27d is at 300% $t_r$ (57 mm)—cycle 1, FIG. 27e is at 300% $t_r$ (57 mm)—cycle 3, and FIG. 27f is at the End (0% $t_r$).

FIG. 28a shows the input lateral displacements and FIG. 28b shows the hysteresis loops for the $3^{rd}$ cycle of each amplitude.

FIGS. 29a-g show modifications to the vertical faces of the bearing and contact surfaces.

DETAILED DESCRIPTION OF THE EMBODIMENTS

Figure 1:
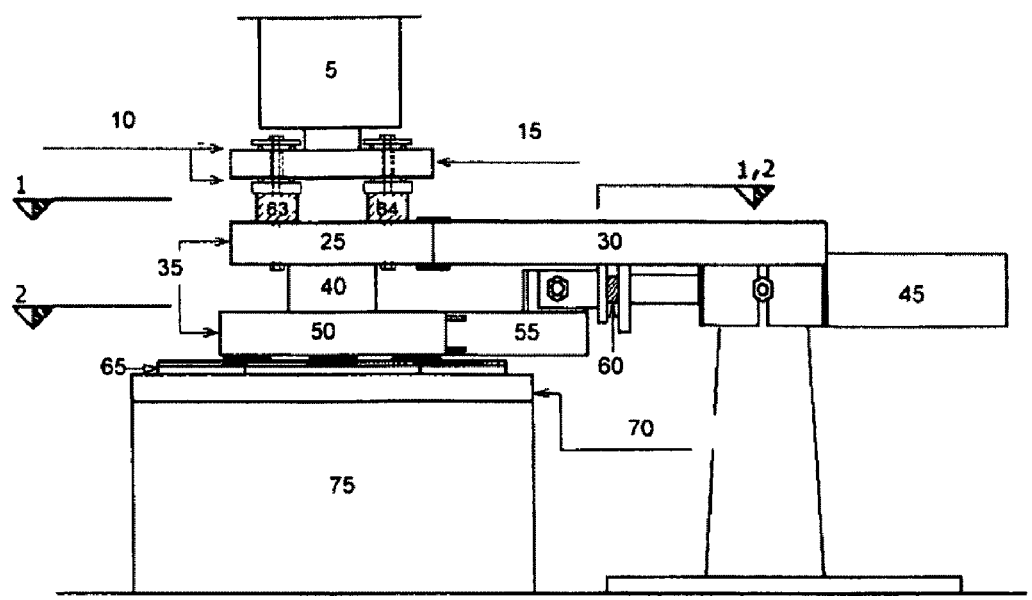
FIG. 1 shows the test setup and instrumentation arrangement used in one embodiment of the invention.
Figure 1:
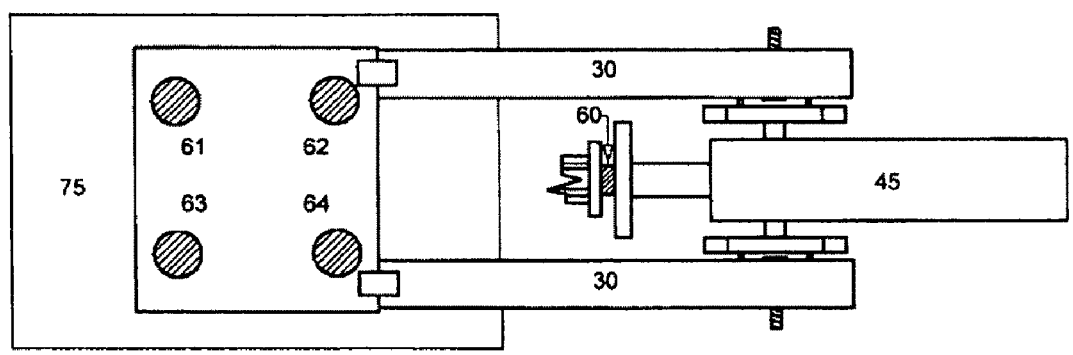
Figure 1:
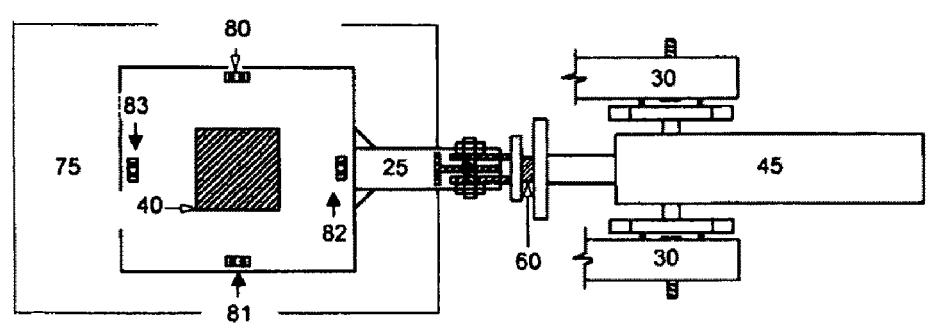

The base isolation system of the present invention utilizes FREI bearings that are located between the superstructure and substructure with no bonding at the contact surfaces of the bearings. This is denoted as an "unbonded application". In such an application, FREI bearings, with the appropriate aspect ratio, exhibit stable rollover deformation. In a FREI bearing utilized in unbonded application as the base is displaced laterally, the top and bottom faces of FREI-bearing roll off the upper and lower contact supports, respectively. This lateral deformation is denoted as "rollover deformation". It occurs as a result of both unbonded application and lack of flexural rigidity of fiber reinforcement sheets. A properly designed FREI bearing can sustain very large lateral displacements while remaining stable, by maintaining a positive incremental lateral load resisting-capacity throughout the hysteresis loops. As such, the resulting permissible deformation is called "stable rollover" (SR) deformation. SR-deformation results in a significant decrease in the horizontal stiffness of the bearing and adds to its efficiency as a seismic isolator. An unbonded FREI bearing that exhibits SR-deformation is denoted as a "stable unbounded" (SU) FREI. In a SU-FREI bearing, the "full contact vertical face lateral displacement" ($\delta_{fc}$) occurs when the original vertical faces of the bearing completely come in contact with the horizontal upper and lower supports. As a result, significant stiffening in the hysteresis loops is observed which effectively places a limit on the extreme lateral displacements that can occur under unanticipated seismic excitation levels. Rollout instability lateral displacement, denoted as $\delta_{max}$, for this particular type of bearing is significantly larger than $\delta_{fc}$.

Square carbon-FREI bearings with different aspect ratios, in one embodiment, were tested under compression and cyclic shear to evaluate the mechanical characteristics of the bearings employed in one final design. An analytical approach was used to model the lateral load-displacement hysteresis of the carbon-FREI bearings. The dynamic response of a representative Base Isolated (BI) building as well as its corresponding Fixed Base (FB) model against an input earthquake confirmed the seismic mitigation efficiency of the base isolation system. The BI-system in the above mentioned BI-building comprised SU-FREIs that were located relatively close to one another. As a result of the short distance between the adjacent bearings, significant cost savings are achieved in both the concrete tie-beam located at the top of the bearings to carry the superstructure between them, and the foundation system.

In a fiber reinforced elastomeric isolator (FREI) bearing under vertical compression loads, elastomer layers tend to extend laterally. However, if a strong bond exists between the elastomer and the fiber reinforcement, this lateral extension in the elastomer is restrained by the reinforcement layers. Accordingly, fiber reinforcement layers are stretched in tension and the elastomer layers experience compression except at the extreme outer edges where the bulging elastomer is subjected to tension. Fiber reinforcement sheets are made of either bi-directional fabric or alternating unidirectional fabrics with perpendicular orientation.

The design properties of unbonded square carbon-FREI bearings, including displacement characteristics and damping properties were evaluated through compression (vertical) and cyclic shear (horizontal) tests. The relevant design provisions of ASCE 7 (2005), a commonly employed standard in the design of seismically isolated structures, were utilized to verify the lateral response of the tested bearings.

EXAMPLE 1

In one embodiment of the present invention, two carbon-FREI bearings were built. Each bearing consisted of bonded layers of intermediate elastomer and reinforcement as well as two bonded thinner elastomeric covers at the top and bottom. The total thickness of rubber layers was $t_r$=94 mm. The width was b=200 mm and the total height was approximately h=105 mm. The shape factor, defined as the ratio of loaded area to load free area of the elastomer layer, was S=10.6 and the aspect ratio (i.e., width to total height ratio, sometimes called the second shape factor) of the bearings was approximately R=1.9. The elastomer was a soft compound of natural gum rubber with a hardness of 40 Durometer Shore A and bi-directional carbon fabric was utilized as the reinforcement. The bearings were made without the use of a mold and all vertical faces were trimmed with a band saw. A finishing coat of bonding compound was applied to the vertical faces of each bearing to prevent any premature delamination.

FIG. 1a shows a sketch of the test setup which was designed to perform both the vertical and horizontal (cyclic) testing on the bearings (40). The bearing (40) was located between two 100 mm thick steel platens (25) and (50). Horizontal displacements were imposed via a horizontal hydraulic actuator (45) attached to the lower platen (50). The lower platen (50) was mounted on four linear bearings (65) and could move ±150 mm with respect to the upper platen (25). The upper platen (25) was braced to the body of the horizontal actuator (45) at its lateral sides through two arms (30) providing a self-equilibrating system. The entire apparatus was mounted on a stand (75). The bearing was subjected to near pure shear as the action and the reaction horizontal forces passed through its midheight.

FIGS. 1b and 1c, which are sectional views 1-1 and 2-2 shown in FIG. 1a, illustrate the instrumentation used for the test setup. Load cell LC#1 (60) was used to measure the horizontal loads corresponding to different horizontal deflections imposed on the bearing (40). The relative horizontal movements between the lower and upper platens (50, 25) were monitored through a string pot (35 in FIG. 1a). Four laser displacement transducers (LDT), (80 81 82 and 83),) were used to measure the vertical deflection of the bearing (40) at its four sides during the vertical testing. The vertical deflection was calculated by taking the average value of the LDTs readings. To achieve a symmetrical setup, four identical load cells (61, 62, 63 and 64) were used to measure the vertical load. Steel bearings (10) were placed between the upper platen (25) and these four load cells (61, 62, 62 and 64) to ensure minimum horizontal load would be transferred to the load cells measuring the vertical load. The vertical load was applied through a vertical ram (5).

Figure 2:
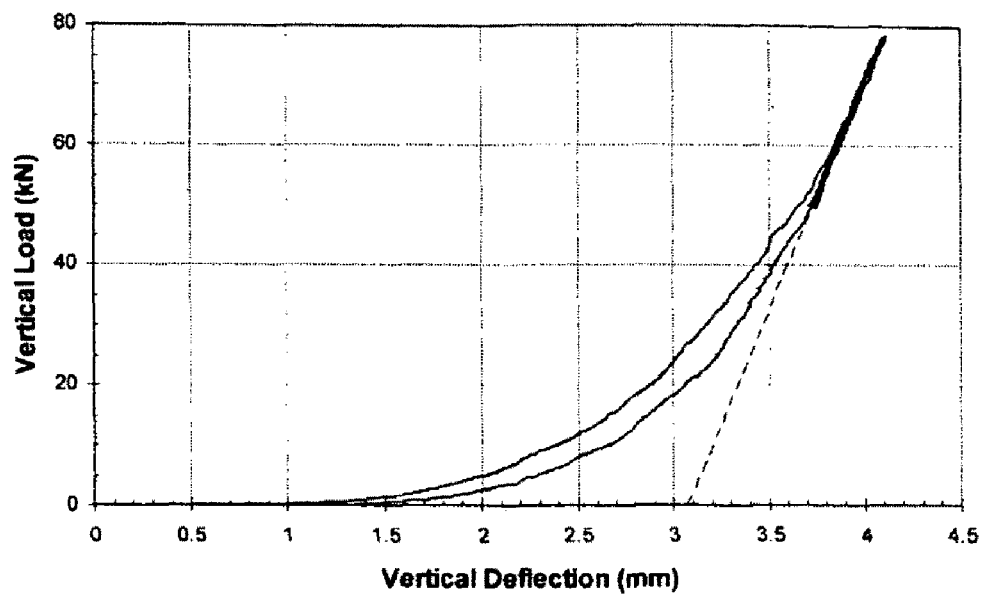
FIG. 2 shows the vertical load-deflection relationship under 64 kN vertical load for two bearings B1 and B2 in an embodiment of the present invention.
Figure 2:
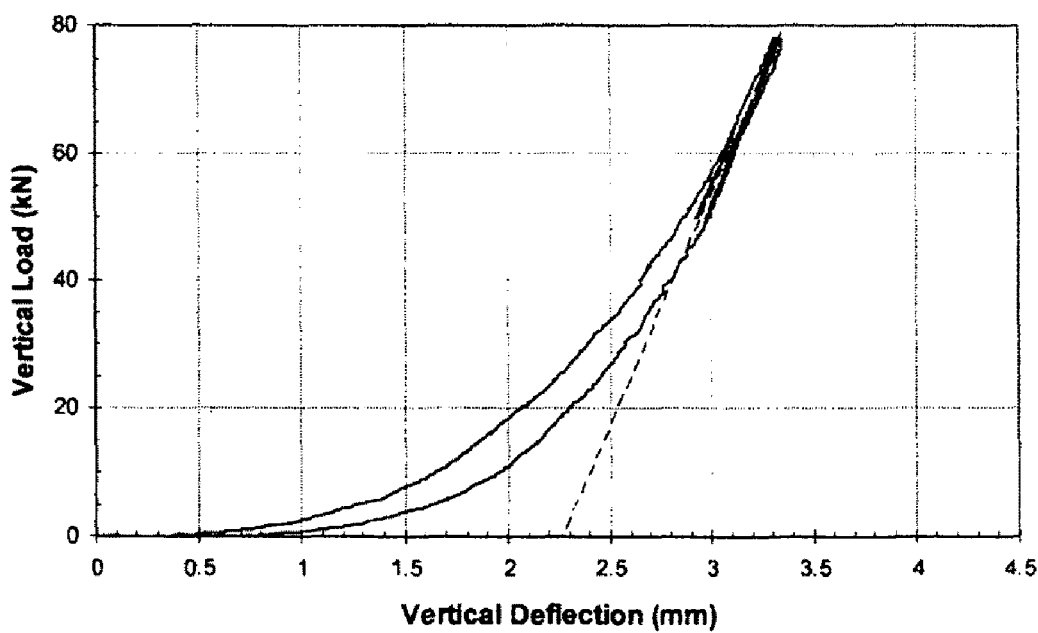

The vertical compression modulus as well as the maximum vertical deflection of the bearings at 1.6 MPa design vertical pressure (64 kN), were evaluated through vertical testing. FIGS. 2a and 2b present the results of the vertical test on Bearings B1 and B2, respectively. The slope of the dashed straight line represents the average stiffness of each bearing during the cyclic reversals of loading.

From the test results, the vertical stiffness of the bearings were calculated as; $(K_V)_{B1}$=76.13 kN/mm, and $(K_V)_{B2}$=72.87 kN/mm. These correspond to effective compression modulus values of $(E_c)_{B1}$=178.9 MPa, $(E_c)_{B2}$=171.2 MPa, and effective vertical frequency values of $(f_v)_{B1}$=17.2 Hz, and $(f_v)_{B2}$=16.8 Hz, respectively, which are considered satisfactory values for isolation applications. Accordingly, the bearings of this embodiment provide sufficient vertical stiffness for vertical pressures around the design value of 1.6 MPa.

Cyclic tests were performed under horizontal displacement control and vertical load control. The following test procedure was used. While the bearing was subjected to a constant vertical pressure (1.6 MPa), four fully reversed sinusoidal cycles of horizontal displacements having amplitudes of 25% $T_r$, 50% $t_r$, 75% $t_r$, 100% $t_r$, 125% $t_r$, 150% $t_r$, and 200% $t_r$ (where $t_r$ is the total thickness of rubber layers in each bearing) were applied. For each amplitude, the bearing was vertically loaded up to the target load. Subsequently, four cycles of horizontal displacement were applied after which the bearing was vertically unloaded.

Figure 3:
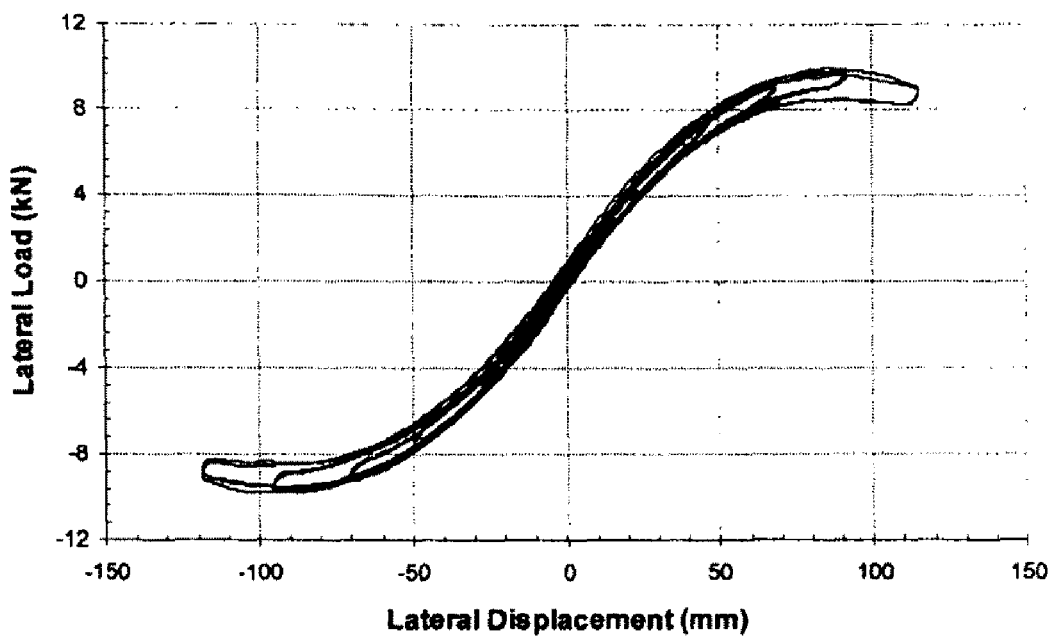
FIG. 3 shows the lateral load-displacement behavior for Bearing B1 (aspect ratio $R_{B1}=1.9$, and $t_{r,B1}=94$ mm), in a series of cyclic tests having amplitudes of 25, 50, 75, 100, and 125% $t_{r,B1}$, under constant vertical compression (a) 1.6 MPa, (b) 3.2 Mpa.
Figure 3:
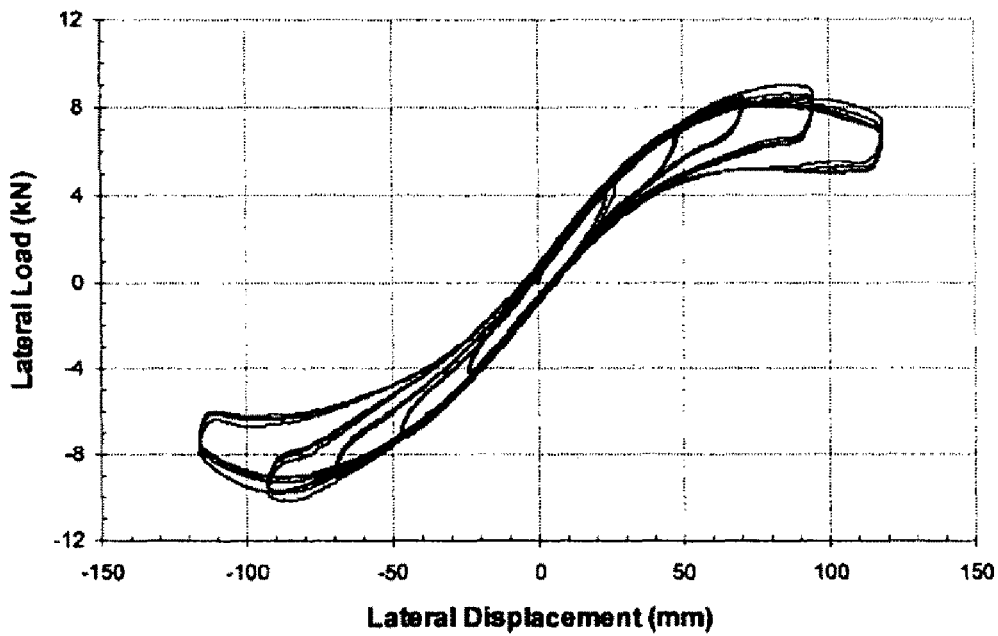

The horizontal load-displacement behavior of Bearings B1 and B2 at different values of peak horizontal displacement was found to be similar. FIG. 3a shows the horizontal load-displacement curves of Bearing B1 subjected to 25, 50, 100, and 125% $t_r$ horizontal displacement. As illustrated, the bearing behaved linearly up to approximately 75% $t_r$ horizontal displacement with an effective horizontal stiffness $K_{h,B1}$=0.13 kN/mm and 2.1% effective damping ratio calculated using equations provided by ASCE 7 (2005, American Society of Civil Engineers. "Minimum design loads for buildings and other structures." ASCE/SEI 7-05). At larger lateral displacements, nonlinear response with a tendency of softening can be observed. This softening was associated with the unstable rollover deformation of the bearing.

To evaluate the influence of higher vertical pressure on improving the horizontal response of the bearing, cyclic tests were duplicated under a larger constant vertical pressure of 3.2 MPa (see FIG. 3b). At 75% $t_r$ horizontal displacement, the effective horizontal stiffness of the bearing decreased to 0.12 kN/mm and the effective damping ratio increased to 5.2%. A significant increase in the damping ratios of FREIs due to higher vertical pressure was a unique feature not found in SREIs. This confirms one of the advantages of using fibers as the reinforcement. At lateral displacements larger than 75% $t_r$, as indicated in FIG. 3b the bearing performed nonlinearly and again tended to show a softening type behavior even though a higher vertical pressure (twice as larger as the design value) was applied.

No damage was visible after the cyclic tests were completed. Furthermore, the repeatable pattern of the load hysteresis loops, including the maximum lateral displacements, demonstrated that negligible damage occurred to the bearings. As a result of the softening behavior, the performance of Bearings B1 and B2 with an aspect ratio of R=1.9 was considered unacceptable. In an attempt to improve the lateral load-displacement behavior of the bearings, the aspect ratio was increased by reducing the bearing thickness. In order to evaluate the influence of different aspect ratios on improving the lateral response of the bearings, new Bearings NB1 and NB2 were cut from B1 and B2 to achieve aspect ratios of $R_{NB1}$=2.5 and $R_{NB2}$=2.9, respectively.

Figure 4:
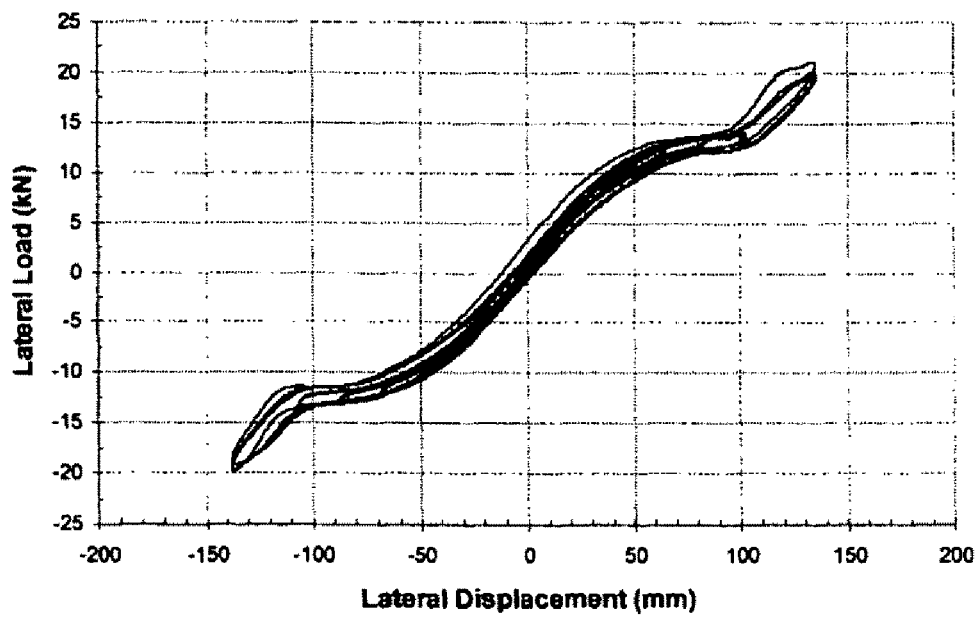
FIG. 4 shows the lateral load-displacement behavior, under constant 1.6 MPa vertical compression, in a series of cyclic tests having amplitudes 25, 50, 75, 100, 125, 150, and 200% $t_r$.
Figure 4:
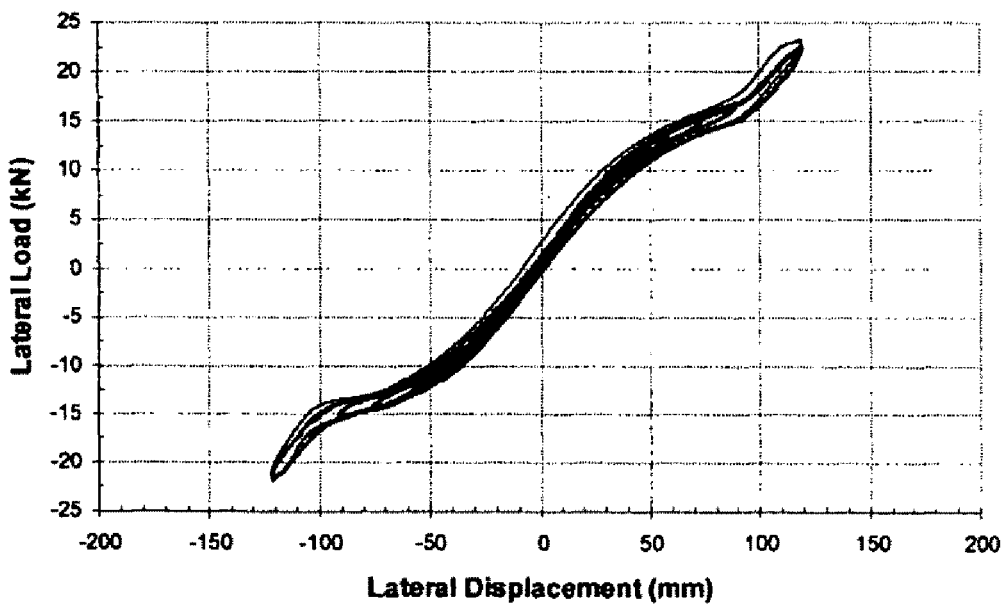

FIG. 4 shows the hysteresis loops of NB1 when subjected to cyclic lateral displacements with different amplitudes ranging from 25% to 200% $t_{r,NB1}$ (where total thickness of rubber layers $t_{r,NB1}$=70.5 mm).

As illustrated in FIG. 4a, Bearing NB1 of this embodiment performed almost linearly up to 75% $t_{r,NB1}$≈53 mm lateral displacement with an effective stiffness $K_{h,NB1}$=0.21 kN/mm and effective damping ratio of 1.5%. However, at larger lateral displacements, due to the rollover deformation of the bearing, the tangent horizontal stiffness dramatically dropped to its minimum-yet-positive value. At extreme lateral displacements (larger than 150% $t_{r,NB1}$) when the vertical faces of the bearing contacted the upper and lower platens, a hardening behavior was observed. This was considered to be advantageous as it imposed a limit on the maximum lateral displacement of the bearing and guarantees stability of the device against the maximum considered earthquake.

Bearing NB2, with a total thickness of 69 mm, was cut through the thickness of Bearing B2 so that an aspect ratio of $R_{NB2}$=2.9 was achieved. As a result, the total thickness of rubber layers of the bearing was reduced to $t_{r,NB2}$=61.1 mm.

FIG. 4b shows the hysteresis loops from a set of cyclic tests conducted on Bearing NB2. This bearing showed a linear behavior up to approximately 75% $t_{r,NB2}$≈46 mm lateral displacement with an effective stiffness $K_{h,NB2}$=0.25 kN/mm and an effective damping ratio of 1.3%. However, due to rollover deformation at larger lateral displacements, the tangent horizontal stiffness of the bearing gradually decreased to its minimum value. Analogous to Bearing NB1, at extreme lateral displacements when the vertical faces of the bearing contacted the upper and lower platens, a hardening behavior was observed.

All bearings of this embodiment exhibited a rollover deformation when subjected to lateral loads. This rollover deformation resulted from the unbonded boundary condition of the bearing at its contact surfaces as well as the lack of flexural rigidity in the fiber reinforcement layers. This deformation, which caused a significant reduction in the horizontal stiffness of the bearing, is considered acceptable if the resulting tangent horizontal stiffness of the bearing remains positive. In such a case, when the vertical faces of the bearing touched the upper and lower platens at the extreme lateral displacements, a hardening behavior was observed. This hardening placed a limit on the maximum lateral displacement of the bearing and ensured its overall stability.

As previously indicated, such an admissible deformation is denoted as a "stable rollover" or SR deformation. A stable rollover deformation neither results in a softening behavior, nor does it compromise the overall stability of the bearing. Furthermore, being a seismic isolation device, it adds to the efficiency of the bearing as the horizontal stiffness is reduced. As a result, this unique performance is considered advantageous for application of FREIs with unbonded contact surfaces.

Considering all the bearings tested, the lateral load-displacement performance of Bearings B1 and B2 was determined to be not acceptable as they exhibited softening and negative tangent horizontal stiffness due to unstable rollover deformation (FIG. 3a). The same unacceptable behavior was observed when the vertical compression was doubled (FIG. 3b). It was found that, for a FREI with the same material properties and shape factor (S), the aspect ratio (R) of the bearing played an important role in achieving a stable rollover deformation.

Similar to SREI behavior, an increase in the vertical pressure reduced the horizontal stiffness of a FREI. However, a higher vertical pressure resulted in an increase in the energy dissipated by a FREI (see FIGS. 3a and 3b). This was attributed to an increase in the in-plane tension in the fibers. The carbon fiber fabric of this embodiment consisted of strands of fibers woven together. When a FREI bearing was deformed laterally, the reinforcement layers were curved due to a lack of flexural rigidity. Accordingly, the in-plane tension in the curved fibers forced the strands to slip against each other dissipating energy through friction.

As illustrated in FIG. 4a, the nonlinear behavior of Bearing NB1, due to a stable rollover deformation, had three distinct response components. For minor earthquakes, the bearing can be designed to remain within its initial stage of lateral load-displacement response with an effective horizontal stiffness $K_{h1,NB1}$=0.21 kN/mm. To achieve the maximum efficiency against Design Basis Earthquakes (DBE), the effective horizontal stiffness dropped to the minimum value $K_{h2,NB1}$=0.13 kN/mm. At Maximum Considered Earthquake (MCE), with 2% probability of exceedence within 50 years (2,500 year return period), the bearing was allowed to undergo larger lateral displacements and exhibited a hardening behavior. The effective horizontal stiffness at the latter case was $K_{h3,NB1}$=0.15 kN/mm.

An initial horizontal stiffness of 0.21 kN/mm, in a bearing subjected to a constant vertical compression of 1.6 MPa, resulted in an isolated period of 1.1 s. However, depending on the magnitude of earthquake energy, the effective horizontal stiffness could drop to as low as 0.13 kN/mm and the isolated period could reach a value of 1.4 s which resulted in increased seismic mitigation.

At DBE, the design lateral displacement of Bearing NB1, can vary between 100% to 150% $t_{r,NB1}$ (70 mm to 105 mm). Test results have shown that NB1 can sustain large cyclic lateral displacements up to a maximum value 140 mm (200% $t_{r,NB1}$) with no significant stiffness degradation. Furthermore, after the completion of the cyclic tests no delamination or any other damage was observed in the bearing. Accordingly, at MCE, an upper limit of 140 mm is acceptable for design purposes as the maximum admissible lateral displacement of this bearing.

Comparing FIGS. 4b and 4a, the nonlinear behavior of Bearing NB2 was not as significant as NB1. The effective horizontal stiffnesses of NB2 corresponding to 75, 125, 150, and 200% $T_{r,NB2}$ lateral displacements were calculated to be 0.25, 0.20, 0.18, and 0.18 kN/mm, respectively. Therefore, the isolated period of Bearing NB2 fluctuated between 1 s to 1.2 s. In contrast to NB1, the effective horizontal stiffness of NB2 gradually decreased with an increase in the amplitude of lateral displacement.

Due to the smaller total volume of carbon fiber reinforcement utilized in NB1, the bearing of this embodiment exhibited lower damping ratios than Bearing B1. Depending on the amplitude of lateral displacement, effective damping of Bearings NB1 varies from 1% to 3% which is less than the required value. The smaller volume of carbon fiber reinforcement on NB2, compared to that of NB1, implied lower damping ratios of Bearing NB2. Test results confirmed this expectation. Depending on the amplitude of lateral displacement, the effective damping of Bearing NB2 varied from 0.8% to 2.3%.

After completion of the cyclic tests, no damage in NB2 was visible. Additionally, the stable pattern and repeatability of hysteresis loops at different displacement amplitudes, including 122 mm (200% $t_{r,NB2}$), indicated that no noticeable damage had occurred inside the bearing. As a result, it was found the bearing can be safely subjected to the maximum 122 mm lateral displacement.

The efficiency index of a bearing with nonlinear lateral load-displacement behavior can be defined as the ratio of maximum instant isolated period to the minimum achievable isolated period. This ratio for Bearings NB1 and NB2 were 1.27 and 1.20, respectively. Therefore, NB1 provided more seismic mitigation than NB2.

As a result, for a FREI bearing with the given width, shape factor, vertical load, and elastomer modulus, by providing higher efficiency, an aspect ratio of 2.5 was determined to be close to the optimum value for this particular embodiment.

Figure 5:
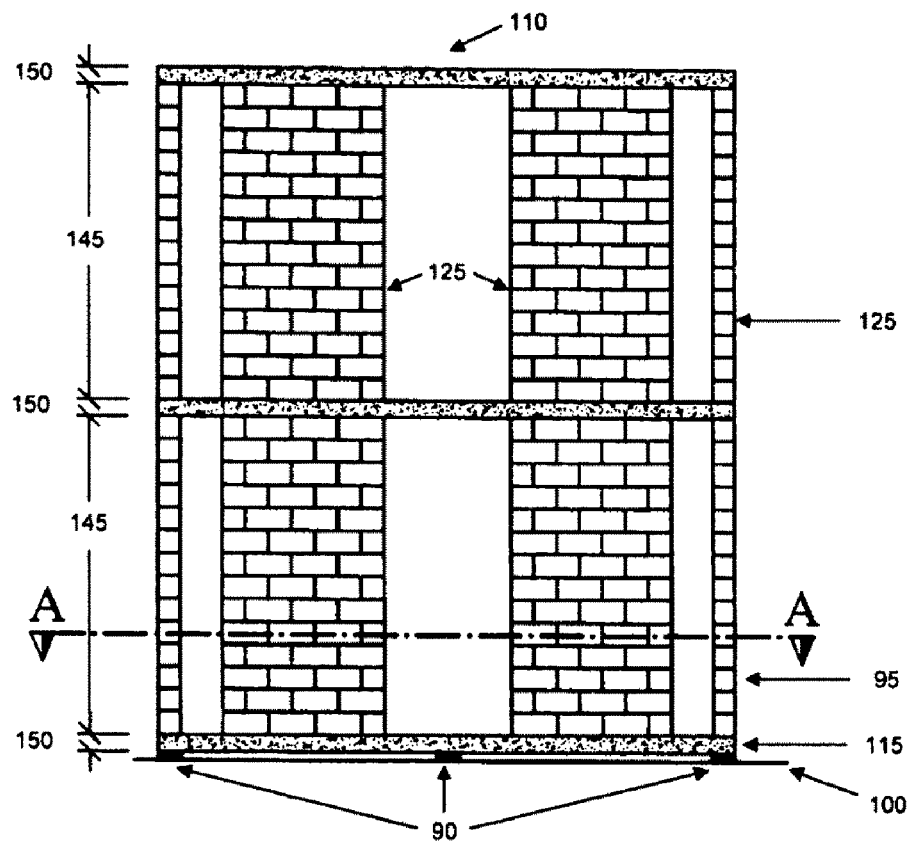
FIG. 5 shows an embodiment of a base isolated masonry building (all dimensions in meter).
Figure 5:
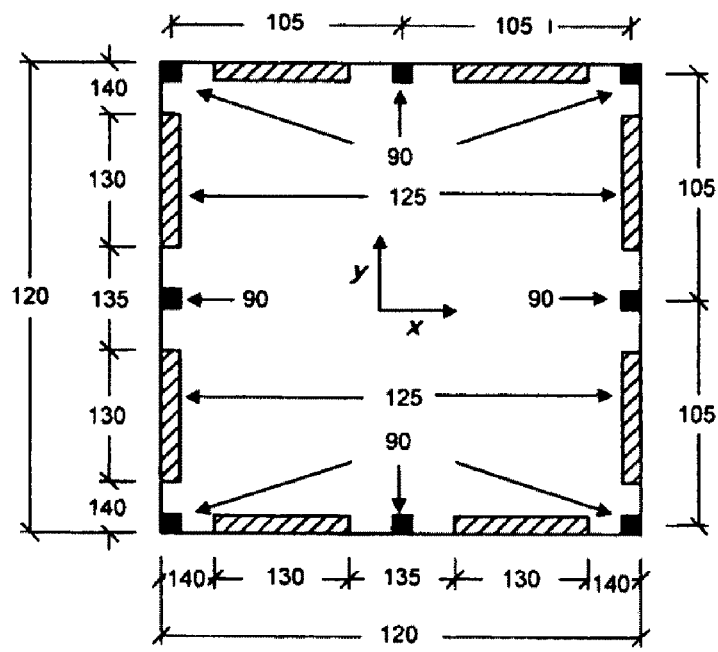

The following 2-storey masonry building (110) (shown in FIG. 5a), located in a region with high seismic risk, is a representative superstructure for use with embodiments of the present invention to be seismically isolated. The building, with square base dimensions of 5 m by 5 m, shown as (120) in FIG. 5b, was constructed with 20 cm, 15 MPa hollow concrete masonry blocks (125). As shown in FIG. 5b, the length (130) of each block (125) is 1.40 m; the distance between each block (135) is 1.10 m; and while the space (140) between each corner and an end block is 0.55 m. The height (145) of each floor is 2.8 m, while the thickness (150) between floors is 0.15 m. To achieve a simple and well defined masonry structural system, each shear wall was considered to have a rectangular cross section with no opening inside, and was assumed to be fully grouted. Intentionally, there were no intersections between the perpendicular walls. Although this structural system may be somewhat more simple than a real building, its dynamic characteristics were in the same range as a typical masonry shear wall structure.

The base isolation system of this embodiment, as indicated in FIG. 5b, consisted of 8 square carbon FREI bearings (90). Three of these bearings (90) are shown in FIG. 5a. An unbonded application for the bearings was utilized which means, unlike the traditional practice, the bearings were simply located between the superstructure (95) and foundation (100) with no bonding at the contact surfaces. As a result, the installation of the bearings was significantly easier. Such an application is justified where no detachment due to overturning occurs between the superstructure and the isolator bearings. Square bearings can be cost effectively produced by cutting a long manufactured FREI strip to the required size. Additional cost savings are achieved by eliminating the thick end plates which are commonly bonded to the top and bottom faces of conventional elastomeric bearings. Also, because of the relatively short distance (105) between the adjacent isolators (90) (i.e., 2.40 m as indicated in FIG. 5b), the concrete beam (115) located at the top of the bearings to carry the superstructure between them, is not required to be heavily reinforced. Moreover, no special foundation system is required. Accordingly, no significant additional cost is imposed on construction of the base isolated building of this embodiment.

The fundamental natural period of the fixed base model of the masonry building (110) shown in FIG. 5a, along either directions x or y, was calculated to be 0.17 s. In this analysis, the in-plane horizontal stiffness of the masonry shear walls due to bending and shear, was calculated in a model where each wall was considered as a cantilever with both ends fixed against rotation and was subjected to a horizontal in-plane load at the top of the storey. To account for cracking in the masonry shear walls, an equivalent thickness was evaluated based on the effective moment of inertia of $I_e$=0.35$I_g$ as suggested for cracked section properties of beams and walls by the ACI code (ACI 318-02, section 10.11.1). Although the equivalent thickness of the walls (i.e., $t_e$=0.35t) was taken into account for modelling purposes, the weight of the walls was calculated based on their full thickness. The total weight of the building, including the base diaphragm, was found to be around 511 kN. Therefore, each bearing was subjected to approximately 64 kN vertical load.

The ratio of the isolated building period to the fixed-base building period is a measure of the benefit of a base isolation system in hazard mitigation. Typical earthquake accelerations are known to have dominant periods of between 0.1 s and 1.0 s with maximum severity often in the range of 0.2-0.6 s. In the frequency range of seismic events, the isolated building period is also known as the seismic isolation period. Therefore, achieving a target isolated building period larger than 1.0 s, being more than 5 times longer than the fixed-base period of the building, is deemed to be reasonable. In the base isolation system of aspects of the present invention, the bearings were subjected to relatively light pressure. Therefore, to achieve the desired isolated building period, a soft compound of rubber material can be utilized in the construction of these bearings.

Figure 6:
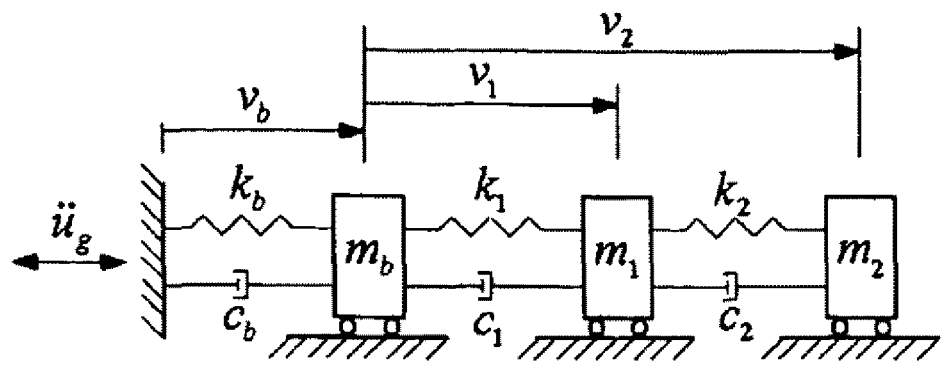
FIG. 6 depicts a mass-spring-dashpot idealization used to model the base isolated building of one embodiment of the present invention.

FIG. 6 illustrates the simple mass-spring-dashpot idealization used to model the prototype base isolated building. The bearing isolators in the base isolation system had nonlinear lateral load-displacement behaviour, along with a 5% equivalent viscous damping ratio, an experimentally evaluated average value. Since in a base isolated system the superstructure remains nearly rigid, it is modeled as linear elastic. In order to account for the largest possible response in the superstructure, this linear model incorporates the cracked section properties for the superstructure (i.e., $I_e$ and $t_e$ of the shear walls were taken $0.35 I_g$ and $0.35 t$, respectively) along with the 2% equivalent viscous damping ratio. To understand the dynamic response of the corresponding fixed-base building, the same linear stiffness properties of the superstructure along with 5% equivalent viscous damping ratio were taken into account in the analysis.

It is understood that performing a time history design analysis will be helpful to verify the seismic mitigation effectiveness of the described base isolation system. This objective is achieved by comparing the dynamic responses of the fixed base and base isolated model of the building subject to a known earthquake record. The governing equations for the dynamic system shown in FIG. 6 are as follows:

$$M^* \ddot{V}^* + C^* \dot{V}^* + K^* V^* = -M^* r^* \ddot{u}_g \quad [1]$$

Where, [2]

$$M^* = \begin{bmatrix} m + m_b & \{r\}^T [M] \\ [M]\{r\} & [M] \end{bmatrix}$$

$$C^* = \begin{bmatrix} c_b & 0 \\ 0 & [C] \end{bmatrix}$$

$$K^* = \begin{bmatrix} k_b & 0 \\ 0 & [K] \end{bmatrix}$$

$$\{r\} = \begin{Bmatrix} 1 \\ 1 \end{Bmatrix}$$

$$r^* = \begin{Bmatrix} 1 \\ \{0\} \end{Bmatrix}$$

$$V^* = \begin{Bmatrix} v_b \\ \{v\} \end{Bmatrix}$$

$$m = m_1 + m_2$$

where, [M], [C] and [K] are mass, damping, and stiffness matrices, respectively, of the fixed base model of the superstructure. The vertical component of ground motion is ignored in this analysis. Additionally, the influence of variation in vertical compression on the lateral load-displacement characteristics of the bearings is neglected. The horizontal stiffness of a bearing is generally affected by the value of the vertical compression load. However, results have indicated that when the applied vertical compression load is significantly lower than the buckling load of the bearing, its influence on the horizontal stiffness of the bearing is negligible.

The acceleration time history for the NS component of the El Centro 1940 earthquake was selected and scaled by a factor of 1.32 in order to match its Peak Ground Acceleration (PGA) to the maximum expected value (with 2% probability of exceedence in 50 years) in Vancouver, British Columbia, Canada, namely, 0.46 g (2005, National Building Code of Canada). This simulated accelerogram is denoted hereafter as the input earthquake. Comparison between the 5% damped pseudo acceleration spectrum of this earthquake and the design spectrum for Vancouver showed that for the periods longer than approximately 0.2 s, the amplification of this earthquake was larger than the expected values in Vancouver. This means that the response of the base isolated building may become even larger than the response of the fixed base model. Values for other locations around the world, including those that are known for seismic activity, can be used to test models and bearings of the present invention.

Figure 7:
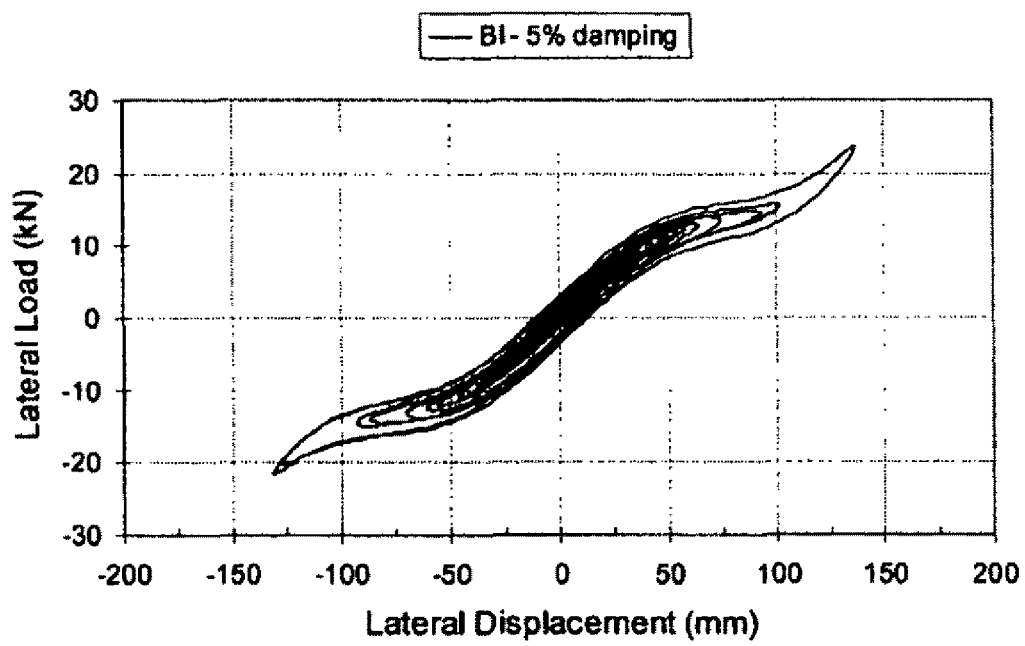
FIG. 7 shows hysteresis loops for carbon-FREI bearings with 5% damping ratio.

FIG. 7 shows the resulting lateral load-displacement hysteresis of the designed bearing, with 5% damping ratio for the input earthquake. Due to sufficient damping properties of the bearing, the peak of the resulting lateral displacement is lower than the lateral displacement capacity of the bearing (i.e., 200% $t_r \approx 140$ mm).

Figure 8:
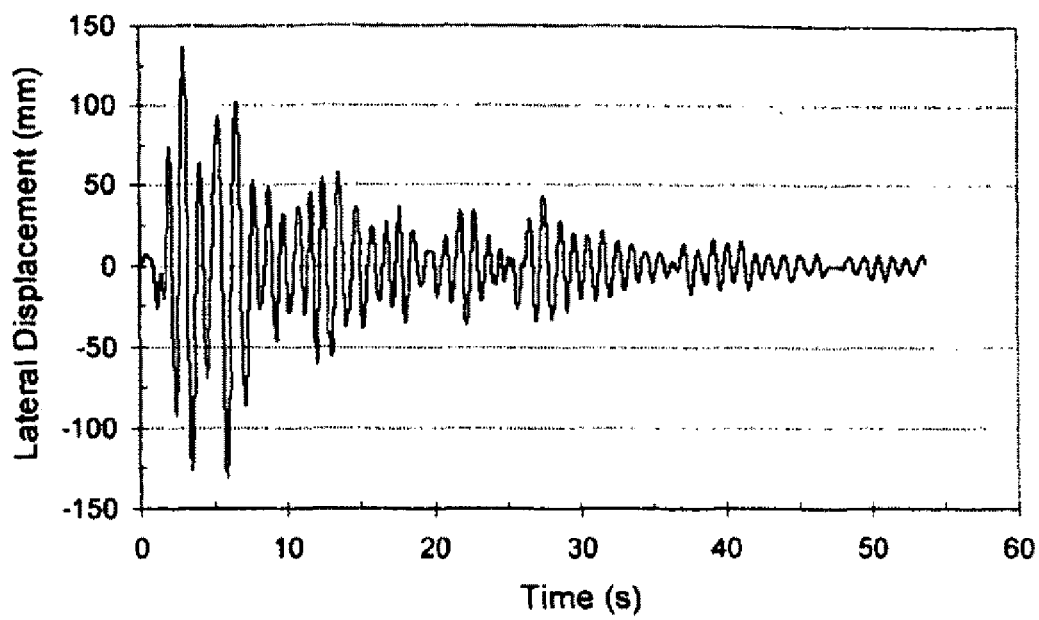
FIG. 8 shows the response time histories of a base isolated building with 5% damped bearings.
Figure 8:
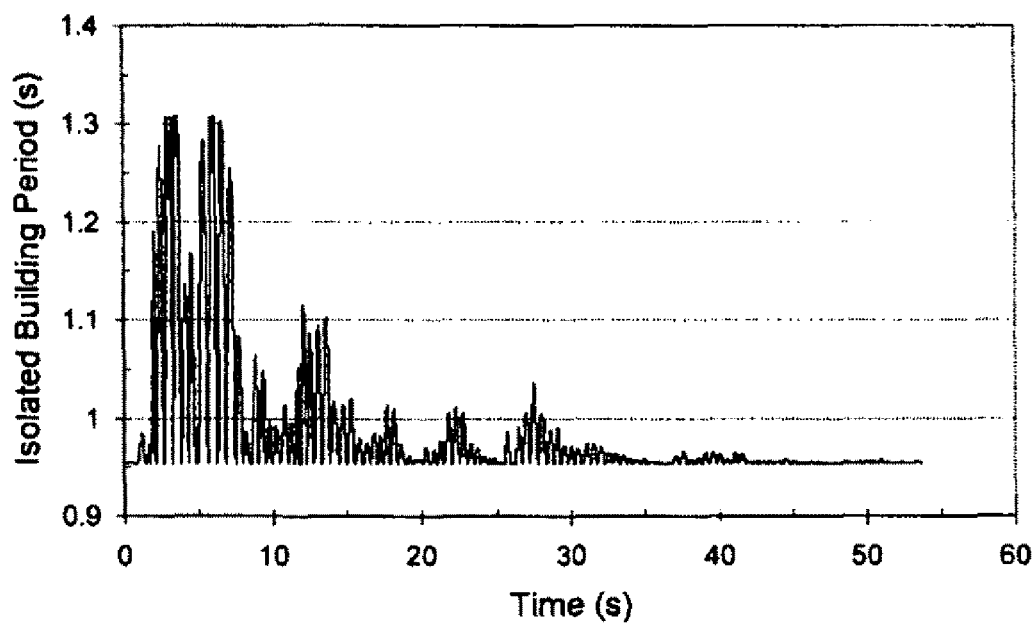

FIG. 8a shows the time history of the designed bearing's lateral displacement and FIG. 8b presents the time history of the isolated building period of the base isolated system. As indicated, the isolated building period, depending on the acceleration amplitude of the input earthquake, fluctuated between 0.96 s and 1.31 s. This occurred as the result of SR deformation behaviour in the bearings. Such an increase in the isolated building period cannot be expected in a FREI bearing with bonded boundary conditions at its contact surfaces or in a traditional SREI bearing. A SREI even in an unbonded application does not exhibit a SR deformation because of the flexural rigidity of the reinforcing layers. These latter bearings perform almost linearly. To achieve an isolated building period of 1.31 s, the total height of FREI-bearings employed in bonded application or SREI bearings, having the same rubber properties, would need to be increased. An increase in the height of these bearings is usually accompanied by an increase in the plan dimensions due to stability considerations. This implies that FREI bearings in an unbonded application have shorter operational height and are significantly more cost effective than conventional bonded bearings. Therefore, the base isolation system of the present invention is an adopted solution for seismic mitigation of ordinary low rise buildings and like structures.

Figure 9:
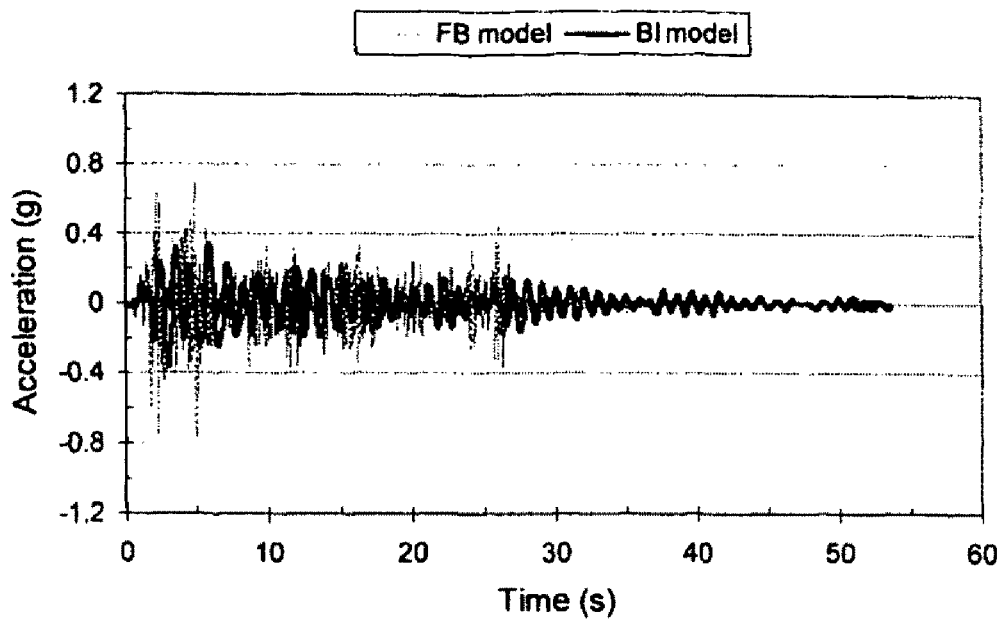
FIG. 9 shows the absolute acceleration of the fixed base (FB) and base isolated (BI) buildings.
Figure 9:
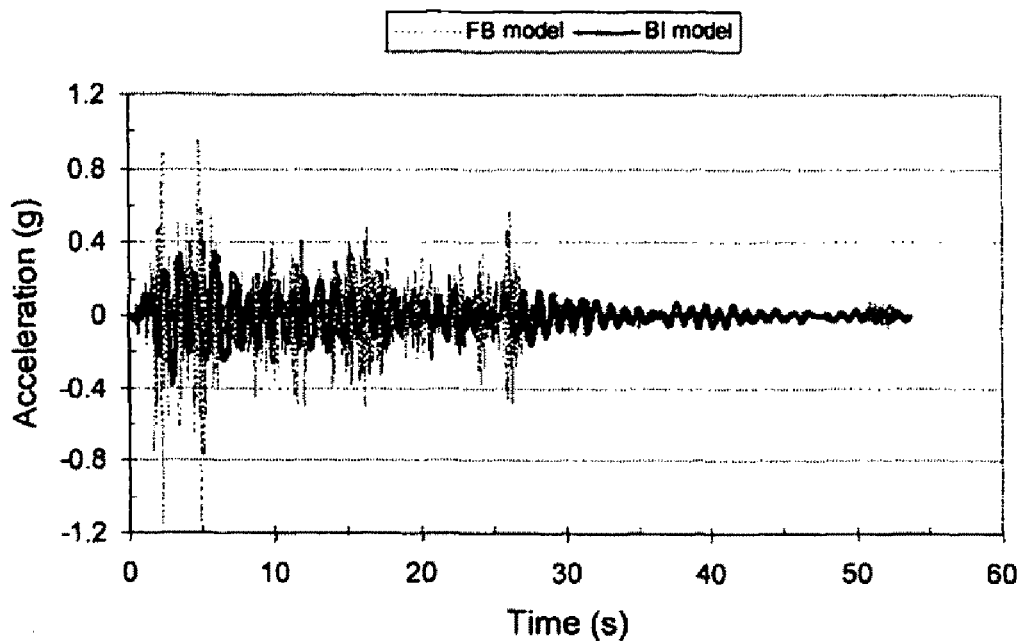

FIG. 9 presents the absolute accelerations at the 1$^{st}$ floor and the roof of the fixed base (FB) and the base isolated (BI) buildings. As indicated, while the induced floor acceleration in the FB-model increases with floor height, it remained nearly constant in the BI-model. This indicates that the superstructure in the base isolated model remained almost undeformed.

Figure 10:
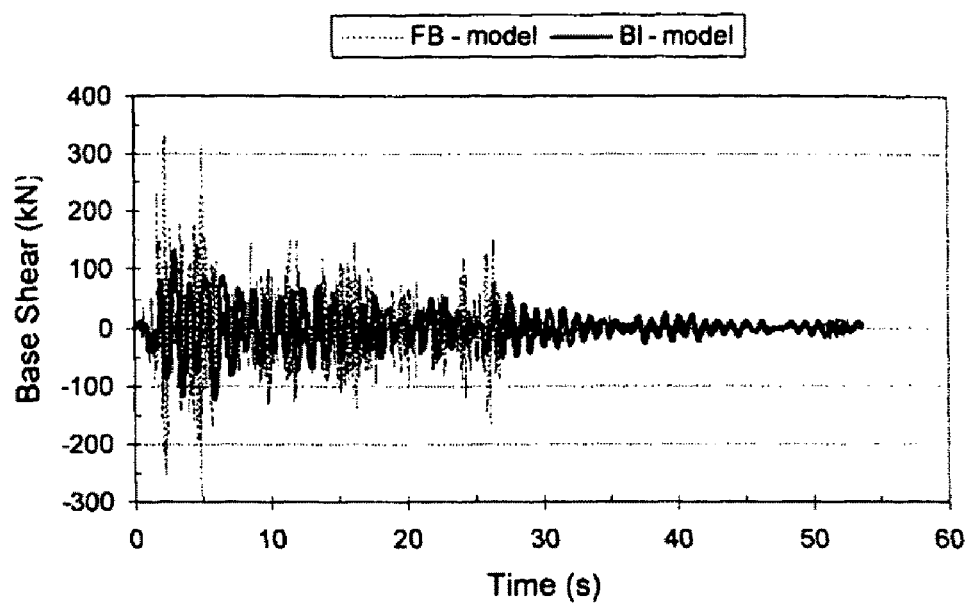
FIG. 10 shows the response history of the FB and BI buildings.
Figure 10:
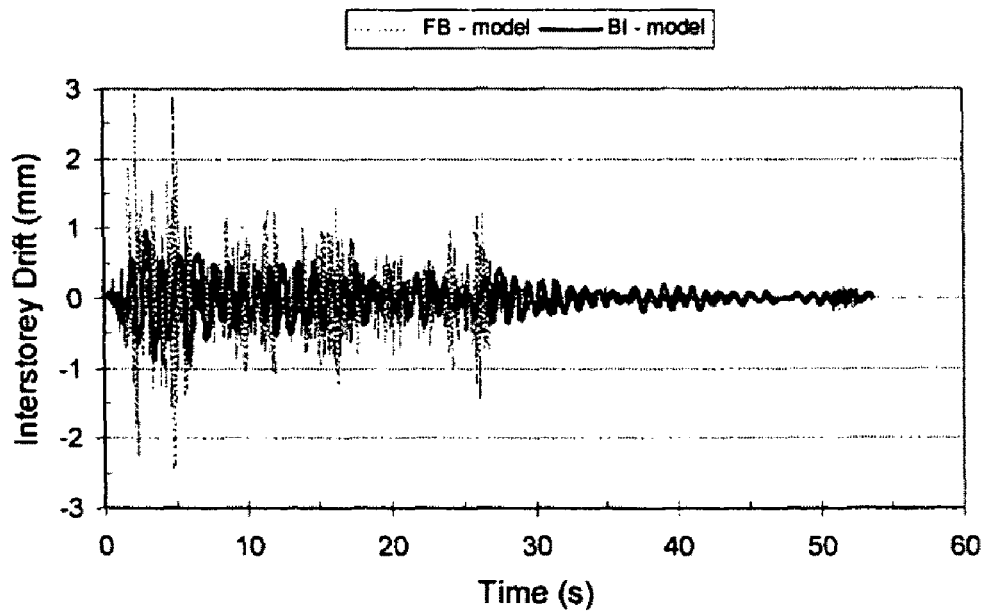

The time histories of base shear as well as the inter-storey drift at the 2$^{nd}$ storey of the building in the FB and BI models are presented in FIGS. 10a and 10b.

Table 1 contains the peak response values for the fixed-base building as well as the corresponding base isolated building with 5% damped bearings in the base isolation system. The significant decrease in the peak response values (around 60%) of the base isolated system with respect to those of the corresponding fixed base model established that the base isolation system of this embodiment performed efficiently against the considered input earthquake. A minimum safety factor of 2.3 against overturning moment in the base isolated building was achieved. This implies that no detachment due to overturning moment, at the contact surfaces of the bearings occurred. Considering the seismic data in Vancouver, BC, a lateral displacement capacity of 140 mm in a base isolation system having 5% effective damping is enough to achieve an isolated building period of 1.31 s. Accordingly, the proposed base isolation system is effective for use in seismic mitigation of buildings and other structures to be constructed in these regions, as well as regions of lower seismic activity.

shear wall structure, as a typical small low-rise building, are described. In a novel application, unbonded square carbon FREI bearings are utilized in the base isolation system of the present invention. Due to the relatively close spacing of the bearings, no special structural elements or foundation system, and no significant additional cost are required for the construction of the base isolated building. Moreover, the unbonded application at these bearings permits the use of shorter operational height and eliminates the need for thick steel end plates. In this regard, the base isolation system of the present invention is a cost effective seismic isolation technique. Analytical results indicated that an unbonded FREI bearing with 5% damping can effectively decrease the seismic demand on the buildings constructed in high seismic risk regions.

TABLE 1

Peak response values of the fixed-base and the base isolated masonry building

|  | Absolute 1st floor | Accel. (g) roof | Inter-storey 1st Storey | Drift (mm) 2nd Storey | Base Shear (kN) | Overt. Moment (kN · m) |
|---|---|---|---|---|---|---|
| FB model | 0.78 | 1.16 | 5.7 | 3.0 | 334 | 1462 |
| BI model | 0.37 | 0.38 | 2.3 | 1.0 | 136 | 556 |
| Response Reduction | 52.6% | 67.2% | 59.6% | 66.7% | 59.3% | 62.0% |

Summary of Example 1

Test results for this embodiment were conducted on square carbon-FREI bearings employing soft compound low damped natural rubber as the elastomer. The bearings were meant to be used for base isolation in structures such as ordinary low-rise residential and commercial buildings or other low-rise structures. The bearings were not bonded to the test platens. For bearings having suitable aspect ratio values (i.e., NB1 and NB2), this particular type of application has resulted in a stable rollover (SR) deformation, which reduced the horizontal stiffness and increased the efficiency of the bearing as a seismic isolation device. As such these bearings are denoted as stable unbonded (SU) FREI-bearings.

Cyclic tests on SU-FREI Bearings NB1 and NB2 showed that the isolated period of these bearings, depending on the severity of earthquake, vary between 1.1 to 1.4 s and 1.0 to 1.2 s, respectively. Furthermore, NB1 and NB2 were tested at up to 140 mm and 120 mm lateral displacement, respectively. Considering the achieved base isolated values, these lateral displacement capacities are considered to be sufficient for many moderate to high seismic risk regions including along the west coast of North America, provided that about 5% and higher effective damping could be achieved in the isolation system. Test results establish that application of the bearings in one embodiment can significantly reduce the earthquake induced force and interstory drift in a masonry shear wall structure with a fixed-base period in the range of 0.1 s.

Vertical testing revealed that carbon fiber reinforcement provides an acceptable vertical stiffness in FREI bearings. A vertical frequency of around 17 Hz was achieved in Bearings B1 and B2, which is considered as an acceptable value for seismic isolation application. Due to the shorter height, Bearings NB1 and NB2 exhibited even larger vertical stiffnesses compared to Bearings B1 and B2.

Results of a time history analysis performed on a fixed-base as well as a base isolated model of a prototype masonry

EXAMPLE 2

Two laminated fiber reinforced elastomeric sheets, denoted as Sheets B1 and B2, having physical dimensions of 200×200×25 mm were constructed. Each sheet consisted of twelve layers of soft unfilled Neoprene™ synthetic rubber (hardness: 37±5 Durometer, shore A (ASTM D2240, 2005)) that were interlaminated with eleven layers of bi-directional (0/90 orientation) carbon fiber fabric as the reinforcement. A cold vulcanizing chemical compound (a rubber cement) was utilized to bond the elastomer and reinforcement layers together. The matrix volume fraction, defined as the relative volume of matrix to the fibers in each fiber reinforcement layer, was approximately 54%. Sheets B1 and B2 were subsequently cut to produce eight bearings in total. Bearings B1-1 and B1-3, which were originally located along the diagonals of Sheet B1, were selected for the prototype testing (see FIG. 11). Bearings B2-1 and B2-3 were similarly chosen from Sheet B2. These ¼ scale model bearings of the prototype full size bearings had 70×70 mm dimensions in plan. The total bearing thickness was approximately 25 mm of which the total thickness of the twelve 1.58 mm thick rubber layers was $t_r$=19 mm combined with eleven 0.54 mm thick reinforcing layers. For a 54% matrix fraction, the implied thickness of the carbon fiber fabric was (1−0.54)(0.54 mm)=0.25 mm. To prevent any unexpected premature delamination, two coats of the bonding compound were applied to the perimeter surfaces of the bearings.

The supplier-provided nominal tensile modulus of the elastomer at 100% elongation was 1.2 MPa. This implied a nominal shear modulus of G=0.4 MPa for an incompressible elastomer with a Poisson's ratio of 0.5. Owing to this, the nominal effective horizontal stiffness of a bearing with cross section area of A (in plan), was estimated by $GA/t_r$ to be 103 N/mm. This equation suggests a uniform distribution of shear stress. It can be used to approximate the shear stiffness of conventional SREI bearings within the practical shear strain range (typically up to 100%), where experimental observations imply a nearly linear lateral load-displacement relationship (1999, Mori A., Moss P. J., Cooke N., and Can A. J. "The Behavior of Bearings Used for Seismic Isolation under Shear and Axial Load." *Earthquake Spectra*, Vol. 15, No. 2, Pages 199-224).

It is understood that this equation overestimates the value of effective horizontal stiffness for a FREI bearing in an unbonded application due to the additional degree of freedom at the contact surfaces compared to traditional bearings in a bonded application (September 2007, Toopchi-Nezhad H., Tait M. J., and Drysdale R. G. "Testing and modeling of square carbon fiber reinforced elastomeric seismic isolators." *Journal of Structural Control and Health Monitoring*, Published online). For a vertical pressure of p=1.6 MPa, the estimated effective horizontal stiffness resulted in an isolated period of 0.55 s for the ¼ scale bearing. According to dynamic similitude law (1999, Harris H. G., and Sabnis G. "Structural Modeling and Experimental Techniques." CRC Press, New York), the displacement, period, and stiffness of the full scale model are respectively, 4, 2, and 4 times larger than the corresponding values of the ¼ scale model, respectively. Using the scaling factor, the corresponding estimated period is 1.1 s for the full scale bearing. From the above estimated period, the initial design of the bearings meet the desired target isolated period provided that the bearings exhibited SR-deformation under large lateral displacements.

As described above, the aspect ratio (R) and shape factor (S) are two crucial physical properties of an elastomeric bearing that significantly influence its mechanical characteristics. By definition, the shape factor is the ratio of vertically loaded area on one face of the elastomer layer to its perimeter load-free area, and aspect ratio reflects the ratio of length to total thickness of the bearing. The shape factor of the bearings studied was approximately S=11, and the aspect ratio was R=2.8. Aspect ratio plays an important role in achieving SR-deformation in the bearing. A smaller aspect ratio makes the FREI bearing more susceptible to rollout instability. In this regard, a block-type FREI bearing with an appropriate aspect ratio is to be employed in an unbonded application. SR-deformation in a block type FREI bearing with unbonded contact surfaces results in a significantly decreased effective horizontal stiffness. Accordingly sufficient flexibility can be achieved in the lateral response of the base isolation system.

As a result of being square in plan view, the bearings were expected to exhibit similar mechanical properties in the two perpendicular directions of movement. One of the vertical faces of each bearing was marked with the bearing's name and deemed as the reference face. The response of the bearing for loading parallel and perpendicular to the reference face was denoted as 0° and 90° response, respectively. A 45° response corresponds to the case where the lateral displacement was along the diagonal of the bearing. Overall, a bearing's response to lateral displacement was categorized as either parallel (i.e., at 0°), perpendicular (i.e., at 90°), and diagonal response (i.e., at 45°).

All of the bearings were tested under vertical compression (vertical test). Additionally, under a prescribed constant level of vertical pressure, the bearings were subjected to sinusoidal cycles of lateral displacement (cyclic test) in a manner like that described in Example 1, above.

The time history pattern of lateral displacement in the cyclic testing portion of the study was varied in terms of displacement rate (rate) and pattern of variation in the amplitude of cyclic lateral displacements. The lateral displacement time history pattern had either an increasing amplitude pattern (ascending amp.) or a decreasing amplitude pattern (descending amp.). All tests were conducted at room temperature. Table 2 lists the example test sequence and details for each bearing, namely cyclic tests with ascending displacement amplitude pattern and rate sensitivity tests.

TABLE 2

Test sequence carried out on each bearing isolator*

| | | Model Scale Bearing | | |
|---|---|---|---|---|
| Sequence | B1-1 | B1-3 | B2-1 | B2-3 |
| 1 | Cyclic test (0°) ascending amp., rate = 30 mm/s | Vertical test p = 0.82, 1.63, 2.45 MPa | Cyclic test (0°) ascending amp., rate = 30 mm/s | Vertical test p = 0.82. 1.63, 2.45 MPa |
| 2 | Rate sensitivity test 0° response, displ. amp. = 100% $t_r$, rate = 30, 45, 76, 114 mm/s | Cyclic test (0°) ascending amp., rate = 76 mm/s | Rate sensitivity test 0° response, displ. amp. = 100% $t_r$, rate = 114, 76, 45, 30 mm/s | Cyclic test (0°) descending amp., rate = 76 mm/s |
| 3 | Rate sensitivity test 90° response, displ. amp. = 150% $t_r$, rate = 30, 45, 76, 114 mm/s | Cyclic test (90°) descending amp., rate = 76 mm/s | Cyclic test (90°) ascending amp., rate = 76 mm/s | Cyclic test (90°) ascending amp., rate = 76 mm/s |
| 4 | Infl. of vert. pressure on horz. response 90° response, p = 1.1, 1.6, 2.4 MPa, displ. amp. = 100% $t_r$, rate = 30 mm/s | Infl. of vert. pressure on horz, response 90° response. p = 0.8, 1.6, 2.4 MPa, displ. amp. = 100% $t_r$, rate = 76 mm/s | Infl. of vert. pressure on horz. response 90° response, p = 0.8, 1.6, 2.4 MPa, displ. amp. = 100% $t_r$, rate = 76 mm/s | Infl. of vert. pressure on horz. response 90° response, p = 0.8, 1.6, 2.4 MPa, displ. amp. = 100% $t_r$, rate = 76 mm/s |
| 5 | Infl. of vert. pressure on horz. response 90° response, p = 1.1, 1.6, 2.4 MPa, displ. amp. = 150% $t_r$, rate = 30 mm/s | Rate sensitivity test 0° response, displ. amp. = 100% $t_r$, rate = 30, 45, 76, 114 mm/s | Cyclic test (45°) ascending amp. rate = 76 mm/s | Rate sensitivity test 0° response, displ. amp. = 100% $t_r$, rate = 30, 45, 76, 114 mm/s |
| 6 | Cyclic test (45°) ascending amp., rate = 30 mm/s | Cyclic test (45°) ascending amp., rate = 76 mm/s | Vertical test p = 0.82, 1.63, 2.45 MPa | Cyclic test (45°) descending amp., rate = 76 mm/s |
| 7 | Vertical test p = 0.82, 1.63, 2.45 MPa | Vertical test p = 0.82, 1.63, 2.45 MPa | Cyclic test (0°) ascending amp., rate = 76 mm/s | Vertical test p = 0.82, 1.63, 2.45 MPa |

TABLE 2-continued

Test sequence carried out on each bearing isolator*

| | Model Scale Bearing | | | |
|---|---|---|---|---|
| Sequence | B1-1 | B1-3 | B2-1 | B2-3 |
| 8 | Cyclic test (0°) ascending amp. rate = 76 mm/s | Cyclic test (90°) ascending amp., rate = 76 mm/s | | Cyclic test (0°) ascending amp., rate = 76 mm/s |
| 9 | | Cyclic test (0°) ascending amp., rate = 76 mm/s | | |

*Unless otherwise stated, cyclic tests were conducted under a constant vertical pressure of 1.6 MPa.

The time history pattern of lateral displacement in the cyclic testing was varied in terms of average displacement rate (rate) and pattern of variation in the amplitude of cyclic lateral displacements. The lateral displacement time history pattern had either an increasing amplitude pattern (ascending amp.) or a decreasing amplitude pattern (descending amp.). Lateral cyclic tests were conducted under displacement control with vertical load controlled to maintain a constant vertical compressive force. Each bearing was subjected to fully reversed sinusoidal cycles of lateral displacement having amplitudes of 25% $t_r$, 50% $t_r$, 75% $t_r$, 100% $t_r$, 150% $t_r$, and 200% $t_r$. Considering the total thickness of rubber layers in each bearing ($t_r$=19 mm), these correspond to lateral displacement amplitudes of 4.8, 9.5, 14.3, 19.0, 28.5, and 38.0 mm, respectively.

When displaced under pure shearing action, a FREI bearing in an unbonded application, exhibits rollover deformation. One study (Toopchi-Nezhad et. al. 2007)) revealed that for a FREI bearing employed in an unbonded application, given the material properties and shape factor (S), the aspect ratio (R) plays an important role in achieving SR-deformation in the bearing. No closed form prior art solution exists to evaluate the proper aspect ratio that leads to SR-deformation, based on the physical geometry and material properties of the FREI bearing. However, results from lateral cyclic tests on prototype bearings having identical characteristics but different aspect ratios, can be used to determine a suitable aspect ratio in the final design of the bearing.

As a primary study only ¼ scale Bearing B1-1, with an aspect ratio of R=2.8, was cut from Sheet B1 (see FIG. 11). The objective was to verify the suitability of the selected aspect ratio in achieving SR-deformation in the bearing. Furthermore, there was a need to verify the adequacy of the resulting effective horizontal stiffness and damping values at different amplitudes of lateral displacement, through examining the cyclic test results.

Bearing B1-1, at its virgin state, was initially subjected to a set of cyclic tests, at 0° orientation, with different amplitudes of lateral displacement. For each amplitude of displacement, the bearing was loaded to p=1.6 MPa vertical pressure. It was subjected to four fully reversed sinusoidal displacements with identical amplitudes and then vertically unloaded. The average rate of cyclic displacements was approximately 30 mm/s. This bearing remained stable and showed acceptable behavior over the entire test range of lateral displacement amplitudes. Next, Bearing B2-1 with the same physical dimensions as B1-1 was cut from Sheet B2 and was subjected to cyclic lateral displacements at 0° orientation under constant 1.6 MPa vertical pressure. As before, the selected displacement rate was 30 mm/s. However, unlike the case of Bearing B1-1, only 3 cycles of lateral displacement were performed at the 6 displacement amplitudes ranging from 25% to 200% $t_r$ and the constant vertical pressure was maintained on the bearing without unloading between the various displacement amplitudes. As an example, only the hysteresis loops for Bearing B2-1 (at 0°), corresponding to the final cycle of lateral displacements at each displacement amplitude, are shown in FIG. 12a where, similar to B1-1, acceptable performance was observed.

The diagonal response of Bearing B1-1 was also investigated through a test sequence similar to the 0° orientation test for Bearing B1-1. FIG. 12b shows the resulting hysteresis loops corresponding to the final cycle for each displacement amplitude. The diagonal cyclic test usually resulted in the most distorted pattern of deformation in the bearing. After completion of the diagonal test, partial debonding in one of the laminates near midheight of Bearing B1-1 was observed. The delamination existed over a length of approximately 1 mm on one face of the bearing and was difficult to see. As shown in FIG. 12b, the bearing remained stable and demonstrated an acceptable lateral response even during the last cycle of displacement.

From FIGS. 12a and 12b, it was observed that, due to rollover deformation in the bearing, the effective horizontal stiffness decreased with increased amplitude of lateral displacement. However, positive values of the tangent horizontal stiffness throughout the hysteresis loops implied that the bearings showed an acceptable SR-deformation. Table 3 shows the test results, discussed above, for Bearings B1-1 (at 0° and 45°) and B2-1 (at 0°).

TABLE 3

Effective horizontal stiffness values and damping ratios corresponding to various lateral displacement amplitudes in Bearings B1-1 and B2-1*

| | | B1-1, 0° (virgin) | | B2-1, 0° (virgin) | | B1-1, 45° | |
|---|---|---|---|---|---|---|---|
| Displacement Amplitude | | Stiffness (N/mm) | Damping (%) | Stiffness (N/mm) | Stiffness (N/mm) | Stiffness (N/mm) | Damping (%) |
| 25% $t_r$ | 1st cycle | 115.5** | 12.5** | 135.7 | 12.7 | 105.9 | 13.2 |
| | Last cycle | 112.1** | 11.1** | 130.4 | 11.1 | 105.5 | 12.3 |

TABLE 3-continued

Effective horizontal stiffness values and damping ratios corresponding to various lateral displacement amplitudes in Bearings B1-1 and B2-1*

| Displacement Amplitude | | B1-1, 0° (virgin) Stiffness (N/mm) | B1-1, 0° (virgin) Damping (%) | B2-1, 0° (virgin) Stiffness (N/mm) | B2-1, 0° (virgin) Stiffness (N/mm) | B1-1, 45° Stiffness (N/mm) | B1-1, 45° Damping (%) |
|---|---|---|---|---|---|---|---|
| 50% $t_r$ | 1st cycle | 96.8 | 10.4 | 107.4 | 9.7 | 83.4 | 10.8 |
|  | Last cycle | 91.6 | 8.7 | 102.6 | 8.5 | 82.4 | 9.8 |
| 75% $t_r$ | 1st cycle | 82.3 | 9.3 | 90.7 | 8.5 | 71.2 | 10 |
|  | Last cycle | 77.2 | 7.9 | 86.4 | 7.5 | 70.3 | 8.8 |
| 100% $t_r$ | 1st cycle | 72.5 | 8.7 | 79.2 | 8.0 | 64.1 | 9.8 |
|  | Last cycle | 68.3 | 7.4 | 76.0 | 7.1 | 63.1 | 8.5 |
| 150% $t_r$ | 1st cycle | 59.2 | 9.7 | 65.2 | 8.7 | 54.6 | 10.9 |
|  | Last cycle | 53.8 | 7.6 | 60.4 | 6.9 | 52.9 | 9 |
| 200% $t_r$ | 1st cycle | 54.2 | 9.5 | 61.0 | 8.5 | 47.7 | 12.9 |
|  | Last cycle | 47.0 | 8.6 | 54.2 | 7.1 | 43.9 | 11.4 |

*Average rate of lateral displacements for all bearings cited in this Table = 30 mm/s
**These values belong to 27.5% $t_r$ lateral displacement amplitude as this was the initial test. The subsequent bearings were tested at 25% $t_r$.

In general, the lateral response of Bearings B1-1 and B2-1 appeared to be consistent. Considering the resulting effective horizontal stiffness values, the corresponding isolated periods of the tested ¼ scale bearings range between 0.5 to 0.8 depending on the lateral displacement amplitude. Therefore, the bearing isolated periods of the corresponding full scale bearing are expected to range from 1.0 to 1.6 s which is either equal to or beneficially longer than the target isolated period.

At 100% elongation, the rubber supplier specified a nominal damping of the elastomer of approximately 5%, whereas significantly larger damping values ranging from 7% to 13% in both the parallel and diagonal response were achieved, depending to the displacement amplitude. This implies that the fiber reinforcement is a new source of energy dissipation in a FREI bearing. Bearing B1-1 performed more effectively in the diagonal response (45°) than the parallel response (0°) due to the lower effective horizontal stiffness and larger damping values achieved. Consequently, the selected aspect ratio of R=2.8 was deemed to be adequate and the preliminary design of the bearings was verified.

For rate sensitive isolators, cyclic testing with sinusoidal lateral displacements should be conducted with an excitation frequency equal to the natural frequency of the isolator at the design displacement (2005, American Society of Civil Engineers. "Minimum design loads for buildings and other structures." ASCE/SEI 7-05). According to the cyclic test results on Bearings B1-1 and B2-1 (see Table 3), at the design lateral displacement (i.e., around 100% $t_r$=19 mm), an isolated period of approximately 0.67 s will be achieved. This implies a natural frequency of 1.5 Hz and an average displacement rate of 114 mm/s in the input sinusoidal cycles of lateral displacement. Although the lateral actuator used in the test setup was able to operate at this rate at ±19 mm (±100% $t_r$) lateral displacement, it was not able to operate at this rate at higher amplitudes. Therefore, a lower rate that would still provide results sufficiently accurate from an engineering perspective was required. This section discusses the procedure followed, leading to the selection of a suitable displacement rate.

All of the model bearings, under constant 1.6 MPa vertical pressure, were subjected to three fully reversed sinusoidal cycles of 100% $t_r$=19 mm lateral displacement sequentially at average rates of 30, 45, 76, and 114 mm/s. A 1.6 MPa constant vertical pressure was maintained. As mentioned above, the average rate of 114 mm/s was associated with the natural frequency of the bearing at the design displacement and was chosen as the reference rate for comparison. The influence of displacement rate on effective horizontal stiffness and damping ratio of the bearings can be seen in FIGS. 13a and 13b, respectively.

Overall, both effective stiffness and damping increased with increased displacement rate. Bearing B2-1 showed the most sensitivity to the displacement rate with approximately a 9% reduction in the effective stiffness and more than 16% reduction in the damping of the bearing at the lowest rate (30 mm/s). Unlike Bearing B2-1, cyclic tests for all other bearings started with the lowest rate and ended at the highest rate. As a result, at displacement rates lower than 114 mm/s, these bearings showed less than 6% and 11% reduction in the effective stiffness and damping, respectively. A rate sensitivity test on Bearing B1-1 was also carried out at 150% $t_r$ (28.5 mm) lateral displacement. Test results showed a similar trend of reduction in stiffness and damping at lower displacement rates.

Figure 13:
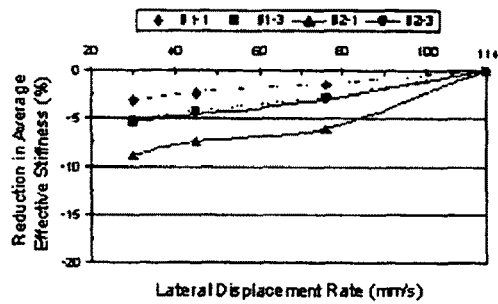
FIG. 13 shows the influence of displacement rates lower than 114 mm/s on lateral response at 100% $t_r$ (19 mm) displacement amplitude. Values represent the average reduction in all 3 displacement cycles.
Figure 13:
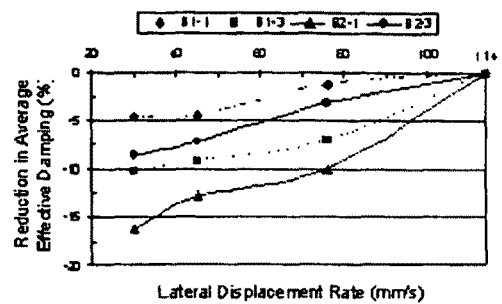

In order to work within the range of equipment capability, an average displacement rate of 76 mm/s was selected. This rate resembled an excitation frequency of approximately 1 Hz at 100% $t_r$ lateral displacement which was sufficiently close to the bearings' natural frequency (i.e., approximately 1.5 Hz). At this rate, as the worst case scenario (results of Bearing B2-1) as shown in FIGS. 13a and 13b, respectively, the effective horizontal stiffness and damping at each cycle are on average 6% and 10% lower than the corresponding values at the natural frequency of the bearings. These variations are considered minor and can be neglected for many practical applications.

Figure 14:
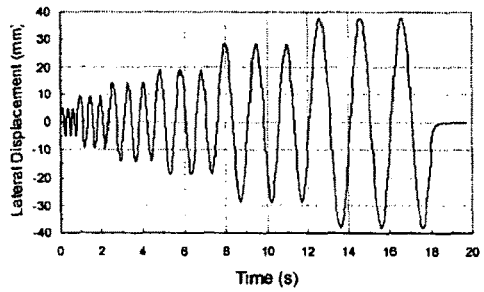
FIG. 14. shows the parallel lateral response (0°) of Bearings B1-3 and B2-3 (lateral displ. ranges: 25%, 50%, 75%, 100%, 150%, and 200% $t_r$, displ. rate=76 mm/s).
Figure 14:
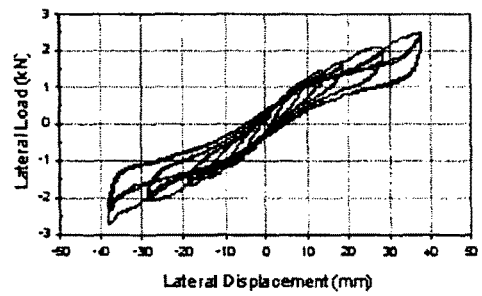
Figure 14:
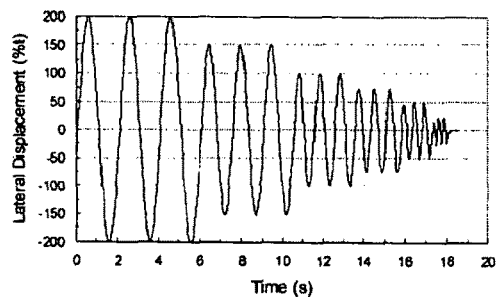
Figure 14:
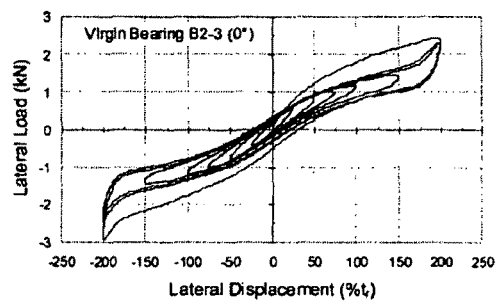

A time history plot of the input excitation, comprising six displacement amplitudes in an ascending pattern, with a displacement rate of 76 mm/s is shown in FIG. 14a. The displacement history contains 3 fully reversed cycles at amplitudes of 25%, 50%, 75%, 100%, 150%, and 200% $t_r$ (where $t_r$=19 mm). Bearing B1-3, at its virgin state, was initially subjected to this displacement history, which was imposed at 0° orientation on the bearing. FIG. 14b shows the resulting hysteresis loops for all cycles of the test and Table 4 contains the corresponding properties of this bearing.

known as the "Mullins effect" (2002, Marckmann G., Verron E., Gomet L., Chagnon G., Charrier P., and Fort P. "A theory of network alteration for the Mullins effect." J. Mech. Phys. Solids 50, Pages 2011-2028). In all bearings tested, at each lateral displacement amplitude, after the first cycle, the hysteresis loops stabilized so that stable effective horizontal stiffness and damping values in the $2^{nd}$ and $3^{rd}$ cycles were achieved. Such stable properties are usually denoted as "scragged" properties. The untangling or breakage of weak crosslinks in an unfilled rubber can be considered as a micromechanical interpretation of this phenomenon. Depending on the elastomer compound, it is known that partial recovery of unscragged properties with time is likely to occur.

TABLE 4

Parallel and perpendicular responses of Bearings B1-3, B2-1, and B2-3*

| | | B1-3, 0° (virgin) | | B2-1, 90° | | B2-3, 90° | |
|---|---|---|---|---|---|---|---|
| Displacement amplitude | Cycle | Stiffness (N/mm) | Damping (%) | Stiffness (N/mm) | Damping (%) | Stiffness (N/mm) | Damping (%) |
| 25% $t_r$ | 1 | 164.0 | 13.7 | 142.7 | 12.4 | 136.5 | 12.5 |
| | 2 | 155.6 | 13.4 | 139.8 | 11.8 | 134.0 | 12.4 |
| | 3 | 154.1 | 13.3 | 138.8 | 12 | 133.2 | 12.8 |
| 50% $t_r$ | 1 | 123.3 | 11.9 | 109.1 | 11.2 | 105.3 | 11.2 |
| | 2 | 116.5 | 10.9 | 104.8 | 10.5 | 101.9 | 10.5 |
| | 3 | 114.6 | 10.8 | 103.8 | 10.4 | 100.8 | 10.7 |
| 75% $t_r$ | 1 | 103.3 | 10.2 | 89.9 | 9.8 | 86.3 | 9.8 |
| | 2 | 97.1 | 9.5 | 86.2 | 9.5 | 83.3 | 9.6 |
| | 3 | 95.3 | 9.4 | 85.2 | 9.4 | 82.4 | 9.5 |
| 100% $t_r$ | 1 | 89.3 | 9.4 | 78.6 | 9.1 | 75.0 | 9.1 |
| | 2 | 84.7 | 8.8 | 75.8 | 8.8 | 73.0 | 8.9 |
| | 3 | 83.6 | 8.7 | 75.2 | 8.7 | 72.3 | 8.7 |
| 150% $t_r$ | 1 | 72.9 | 9.9 | 65.7 | 9.2 | 61.8 | 9.3 |
| | 2 | 68.8 | 8.4 | 63.2 | 8.3 | 59.8 | 8.4 |
| | 3 | 67.1 | 8.3 | 62.2 | 8.1 | 58.9 | 8.2 |
| 200% $t_r$ | 1 | 68.5 | 9.4 | 65.6 | 8.7 | 61.2 | 8.7 |
| | 2 | 63.3 | 8.3 | 61.0 | 7.7 | 57.4 | 8.0 |
| | 3 | 61.6 | 8.1 | 60.0 | 7.4 | 56.4 | 7.8 |

*Average rate of lateral displacements for all bearings cited in this Table = 76 mm/s As seen in FIG. 14b, as with Bearings B1-1 and B2-1, the hysteresis loops showed acceptable response characteristics. However, the resulting mechanical properties are more accurate as they incorporate a more representative displacement rate in the cyclic testing. FIGS. 15a to 15d contain photographs of Bearing B1-3 at various displacement amplitudes for cyclic testing in the parallel (0°) direction. Bearings B2-1 and B2-3 were subjected to the same displacement history presented in FIG. 14a along their perpendicular (90°) orientation. Table 4 contains the resulting mechanical characteristics of these bearings.

During the first cycle of lateral displacements with constant amplitude, all bearings tested in this study exhibited higher stiffness and damping than in the following cycles (see FIG. 14b and Table 4). When an elastomer in its virgin condition is subjected to any constant amplitude of cyclic tension, compression or shear loading, reloading of the elastomer up to the maximum previously achieved displacement amplitude usually requires lower stress than the initial cycle. The maximum difference in the required reloading stresses exists between the first and the second cycles and becomes negligible after 6-10 cycles depending on the elastomer compound (2004, Dorfmann A., Ogden R. W. "A constitutive model for the Mullins effect with permanent set in particle-reinforced rubber." International Journal of Solids and Structures, 41, Pages 1855-1878)). This phenomenon, which is observed in both unfilled and particle-reinforced rubber, is FIGS. 16a and 16b present the variations of lateral response with the amplitudes of cyclic lateral displacement for the bearings listed in Table 5. The values in FIG. 16 represent the average response of all cycles at each displacement amplitude of cyclic testing. As indicated in FIG. 16, due to rollover deformation, the effective horizontal stiffness significantly decreased with increased amplitude of lateral displacement. However, the reduction in damping at displacements larger than 100% $t_r$ was approximately 10% which is considered to be negligible. This indicates that the bearings would effectively reduce the shear force transmitted to the superstructure, while maintaining a sufficient amount of damping to limit the bearing's lateral displacement against severe excitations.

TABLE 5

Diagonal response of Bearings B1-3 and B2-1*

| | | B1-3, 45° | | B2-1, 45° | |
|---|---|---|---|---|---|
| Displacement Amplitude | Cycle | Stiffness (N/mm) | Damping (%) | Stiffness (N/mm) | Damping (%) |
| 25% $t_r$ | 1 | 135.7 | 15.8 | 130.2 | 14.0 |
| | 2 | 131.5 | 16.1 | 130.5 | 14.2 |
| | 3 | 130.6 | 16.1 | 129.7 | 14.2 |
| 50% $t_r$ | 1 | 102.5 | 12.1 | 101.9 | 11.2 |
| | 2 | 101.0 | 11.5 | 99.8 | 10.3 |
| | 3 | 99.9 | 11.4 | 99.0 | 10.1 |

TABLE 5-continued

Diagonal response of Bearings B1-3 and B2-1*

| | | B1-3, 45° | | B2-1, 45° | |
|---|---|---|---|---|---|
| Displacement Amplitude | Cycle | Stiffness (N/mm) | Damping (%) | Stiffness (N/mm) | Damping (%) |
| 75% $t_r$ | 1 | 84.0 | 10.7 | 83.7 | 9.8 |
| | 2 | 82.3 | 10.4 | 81.7 | 9.4 |
| | 3 | 81.9 | 10.2 | 81.1 | 9.4 |
| 100% $t_r$ | 1 | 72.3 | 10.2 | 72.9 | 9.4 |
| | 2 | 71.3 | 9.7 | 71.6 | 8.8 |
| | 3 | 70.8 | 9.7 | 71.2 | 8.8 |
| 150% $t_r$ | 1 | 58.7 | 10.9 | 59.8 | 10.0 |
| | 2 | 57.7 | 10.0 | 59.1 | 8.9 |
| | 3 | 57.1 | 9.8 | 58.3 | 8.9 |
| 200% $t_r$ | 1 | 51.9 | 11.7 | 54.5 | 10.6 |
| | 2 | 49.4 | 11.0 | 51.8 | 9.4 |
| | 3 | 48.4 | 10.9 | 50.5 | 9.2 |

*Average rate of lateral displacements for all bearings cited in this Table = 76 mm/s Unlike Bearing B1-3, Bearings B2-1 and B2-3 had been subjected to a previous set of cyclic tests in the parallel (0°) direction (see Table 2). Accordingly, as indicated in Table 4, while damping values are comparable, Bearings 132-1 and B2-3 showed lower effective horizontal stiffness than B1-3. Bearing B2-3 showed more response reduction in the perpendicular direction (90°) than Bearing B2-1. This bearing had been subjected to previous cyclic testing with a descending pattern of displacement amplitudes starting at 200% $t_r$ and ending at 25% $t_r$. As a result, such a lateral displacement history may have resulted in more damage to the elastomer crosslinks.

Bearings B1-3 and B2-1 were also subjected to diagonal cyclic testing, where the displacement history was applied along the diagonal of the bearings (45° orientation). The test results are listed in Table 5 and FIG. 17 contains photographs of Bearing B1-3 at various displacement amplitudes.

Similar to the parallel and perpendicular responses (0° or 90°) of the bearings, the response characteristics at 45° orientation showed SR-deformation and a similar pattern of variation with the displacement amplitude (See FIG. 18). However, being scragged, stable hysteresis loops at each displacement level were achieved. The elastomer showed minor unscragged properties at the first cycle of 200% $t_r$ displacement. After completion of the test program no visible damage was observed in Bearings B1-3, B2-1, and B2-3.

In this section, the adequacy of both the parallel/perpendicular and diagonal responses of the tested bearings against both 0.4 g and 0.5 g levels of 5% damped spectral accelerations at 1 s period ($S_{M1}$) were verified. For the purpose of this testing, it was presumed that the site class effects (soil properties) are accounted for in these spectral values.

The equivalent lateral-force procedure in ASCE 7 (2005), American Society of Civil Engineers. "Minimum design loads for buildings and other structures." ASCE/SEI 7-05) can be used for the design of many seismically isolated low-rise buildings with regular configuration. This approach takes advantage of the fact that, in this particular type of base isolated building, the first mode of vibration involves lateral displacements almost entirely at the isolation level, while the superstructure remains nearly rigid. Owing to this, the verification procedure can be started by evaluating the design lateral displacement $D_D$ and corresponding effective period $T_D$ given by the following expressions.

$$D_D = \frac{gS_{D1}T_D}{4\pi^2 B_D} \quad (3)$$

$$T_D = 2\pi\sqrt{\frac{W}{k_{Dmin}g}} \quad (4)$$

where, $S_{D1}=\frac{2}{3}S_{M1}$, $B_D$ accounts for the effective damping of the isolator at $D_D$, W represents the effective seismic weight (vertical load) on the isolator, and $k_{Dmin}$ is the minimum effective horizontal stiffness of the isolator at $D_D$, obtained from cyclic testing. At MCE, $D_M$ and $T_M$ are calculated based on a similar set of expressions, however, the subscript D is replaced with M so the variables involved represent the corresponding values at MCE.

Given $S_{D1}$, an iterative procedure using Eqs (3) and (4) was utilized in order to evaluate the $D_D$ and $T_D$ values of the base isolated system. First, an initial estimate of $D_D$ was made. Next, the equivalent full scale value of $k_{Dmin}$ was obtained from Tables 3 or 4 through linear interpolation between the stiffness values corresponding to the lateral displacement levels that bracket the current value of $D_D$. Additionally, for $D_D$>200% $t_r$, the test results at 200% $t_r$ are utilized. Substituting W and $k_{Dmin}$ in Eq. (4), $T_D$ is evaluated and $D_D$ is updated using Equation (3). Iterations are carried out until $D_D$ and $T_D$ converge to their unique values. It is noted that the vertical pressure of p=1.6 MPa implies W=125.4 kN for the full scale bearing.

Parallel/Perpendicular Response Evaluation

Conservatively, the effective damping in the tested bearings at $D_D$ and $D_M$ were assumed to be 8% and 7%, respectively (see Table 4). This yields values of $B_D$=1.12 for DBE and $B_M$=1.08 corresponding to MCE (ASCE 7, 2005). Additionally, to ensure a conservative design, the effective horizontal stiffness values, corresponding to the third cycle of the test, for Bearing B2-3 tested at 90° were utilized (see Table 4). At a specific site with $S_{M1}$=0.4 and $S_{D1}$=0.27, the iterative procedure described above at DBE leads to a base isolated period of $T_D$=1.33 s and lateral displacement of $D_D$=80 mm (≈105% $t_r$) at the center of rigidity of the base isolation system. At MCE this results in a base isolated period of $T_M$=1.48 s and a lateral displacement of $D_M$=136 mm (≈180% $t_r$). Similar calculations carried out for a region with $S_{M1}$=0.5 and $S_{D1}$=0.33 gave values of $T_D$=1.43 s and $D_D$=106 mm 140% $t_r$) at DBE and $T_M$=1.50 s and $D_M$=172 mm (≈226% $t_r$) at MCE.

Diagonal Response Evaluation:

According to Table 5, for lateral displacements larger than 100% $t_r$, the damping in Bearings B1-3 and B2-1 ranges from 9% to 11%. Therefore, a conservative value of 9% effective damping, against both the DBE and MCE, was assumed. This lead to $B_D$=$B_M$=1.16 (ASCE 7, 2005). A similar iterative process, which accounts for the minimum effective horizontal stiffness values (interpolated from Table 5), was carried out. For a spectral acceleration of $S_{D1}$=0.27 at DBE, $T_D$=1.34 s and $D_D$=76 mm (100% $t_r$) and at MCE with $S_{M1}$=0.4, $T_M$=1.55 s and $D_M$=133 mm (175% $t_r$). Similarly, at a specific site with $S_{M1}$=0.5 and $S_{D1}$=0.33, at DBE, $T_D$=1.44 s and $D_D$=103 mm (≈136% $t_r$) and at MCE, $T_M$=1.61 s and $D_M$=173 mm 228% $t_r$).

A close examination revealed that at 200% $t_r$ lateral displacement, the originally vertical faces of the bearings had not fully contacted the upper and lower platens. Therefore, this lateral displacement was not the full contact lateral displacement ($\delta_{fc}$) of the bearings. Results from cyclic tests conducted on a bearing with similar properties to the bearings tested in this research program showed that the bearing was able to safely accommodate lateral displacements greater than 250% $t_r$. Consequently, the bearings are able to perform satisfactorily under the levels of seismic hazard specified herein.

Significant seismic mitigation is expected in low-rise buildings (having fixed base periods of around 0.1 to 0.2 s), that are seismically isolated using the proposed bearings. If, due to enormous torsional effects or higher earthquake hazards, a larger lateral displacement capacity in the bearings is needed, the bearing's design can be modified accordingly, based on the description provided herein. Results of vertical testing showed that vertical frequency of the ¼ scale bearings exceeded 40 Hz. This is equivalent to 20 Hz for the full scale bearings, which is more than sufficient as it is significantly higher than the maximum resulting base isolated frequency (i.e., $1/T_{min}=1/(1.33 s)=0.75$ Hz). As a result, the contribution of the rocking modes in the dynamic response of the base isolated structure becomes insignificant.

Summary of Example 2

Lateral cyclic testing was conducted on ¼ scale carbon Fiber Reinforced Elastomeric Isolator (FREI) bearings. The bearings were employed in an unbonded application as they were not attached to the upper and lower platens of the test machine. Since the fiber reinforcement has no appreciable flexural rigidity, the unbonded application resulted in a SR-deformation in the bearings when they were laterally deformed. The full contact vertical face lateral displacement ($\delta_{fc}$) of the bearings occurred when their originally vertical faces completely came in contact the upper and lower platens. Rollout instability lateral displacement, which is denoted as $\delta_{max}$, is expected to be significantly larger than $\delta_{fc}$. All tested bearings exhibited a positive incremental load-resisting capacity throughout their lateral load-deflection response. The bearings showed damping ratios larger than the supplier-specified inherent damping of the utilized elastomer. The effective horizontal stiffness and damping increased with an increase in the rate of lateral displacements. However, the effective horizontal stiffness was found to be less sensitive than the damping to variations in the lateral displacement rate.

Although a soft unfilled (low-damped) Neoprene™ was used as the elastomer, the lateral response of the tested FREI bearings in an unbonded application was found to be, in general, similar to that of conventional high-damped steel reinforced elastomeric bearings. The response can be characterized by larger effective horizontal stiffness and damping values at lower lateral displacement levels, which tend to minimize response under wind load and minor seismic excitations. Over the lateral displacement range of 100% to 200% $t_r$ the effective horizontal stiffness is significantly decreased due to rollover deformation in the bearing. The decreased effective horizontal stiffness increases the isolated period of the bearing, which improves its efficiency as a seismic isolator. At larger lateral displacements (larger than 200% $t_r$) when the originally vertical faces of bearing fully contact the upper and lower platens, a significant stiffening in the hysteresis loops is observed. This effectively places a limit on the lateral displacements that can occur under unanticipated seismic excitation levels. As such, efficient seismic mitigation was achieved with the tested bearings.

For those bearings that were subjected to identical loading history, the variability of the observed response was relatively low. This can be observed by comparing test results for Bearings B1-1 and B2-1 in Table 3, Bearings B2-1 and B2-3 in Table 4, and bearings cited in Table 5. The predicted nominal effective horizontal stiffness of the bearings (i.e., $GA/t_r=103$ N/mm) was found to be in close agreement with experimental results at lateral displacements of approximately 50% $t_r$. Accordingly, in the preliminary design, it can be used as a conservative approximation for the horizontal stiffness of the bearings at design lateral displacements (i.e., 100% to 150% $t_r$).

The exploitation of square FREI bearings in an unbonded application is possible based on this invention. According to the design provisions in ASCE 7 (2005), the tested bearings may be effectively used in seismic mitigation of many low-rise buildings with fixed base period of around 0.2 s that are constructed in seismic regions with a 5% damped spectral accelerations at 1 s period ($S_{M1}$) of up to 0.5 g. The design of the FREI bearings may be modified to permit their use in regions of higher seismic acceleration. Unique advantages, such as superior damping properties, the possibility for mass production, simplicity of cutting, ease of unbonded installation, and elimination of the need for the thick steel end plates highlights the significant potential of this base isolation system to be applied as a cost effective method to mitigate the seismic response of many ordinary low-rise buildings worldwide.

EXAMPLE 3

The carbon SU-FREI bearings of Example 3 were identical to those of Example 2. The influence of a number of different parameters on the lateral additional dynamical variables were studied in this example.
Influence of Lateral Displacement Amplitude History As indicated in Table 2, Bearings B1-3, B2-1 and B2-3 were subjected to cyclic sinusoidal lateral displacements with an Ascending Amplitude (AA) pattern ranging from 25% $t_r$ to 200% $t_r$ (see FIG. 14a). Bearings B2-3 and B1-3 were tested with a Descending Amplitude (DA) pattern of lateral displacements starting at 200% $t_r$ and ending at 25% $t_r$ (see FIG. 14c). Consistently, the 1.6 MPa constant vertical pressure was applied to the bearings throughout the cyclic testing. Additionally, the average rate of lateral displacements for all cases was 76 mm/s.

By definition, the term "virgin" in this paper applies to the bearings which had not been previously tested in any lateral direction. FIGS. 14(b) and 14d show the resulting lateral load-displacement hysteresis loops at 0° for the virgin Bearings B1-3 and B2-3. As seen in FIG. 14b, the first cycle of lateral displacements with constant amplitude was associated with unscragged response with larger load-resisting capacity and damping than the following cycles. Once scragged at each displacement amplitude, the bearing exhibited stable loops. Additionally, at each lateral displacement amplitude, significant stiffening following the first cycle was observed. However, similar phenomena were not observed in the bearing's response to a lateral displacement history with a DA-pattern. As shown in FIG. 14d, the initial cycle with the displacement amplitude of 200% $t_r$, scragged the virgin Bearing B2-3 so that stable hysteresis loops were achieved for all subsequent cycles with the same or smaller displacement amplitudes. Additionally, the hysteresis loops did not show any stiffening at the extreme ends of displacement amplitudes lower than 200% $t_r$, which is observed when comparing FIGS. 14b and 14d.

In general, compared to a DA-pattern of lateral displacements, an AA-pattern resulted in larger effective horizontal stiffness. However, at 200% $t_r$ which corresponds to the largest amplitude, the response properties were found to be very similar and thus independent of the history of lateral displacement.

Regardless of the lateral displacement history and direction of lateral displacement, all of the bearings showed a positive incremental load-resisting capacity throughout the lateral response. Additionally, at the largest lateral displacement amplitude, when the originally vertical faces of the bearings (during the parallel or perpendicular response) contacted the platens of the test machine, significant stiffening was observed. Therefore, the resulting rollover deformation was considered as an acceptable SR-deformation.

Figure 19:
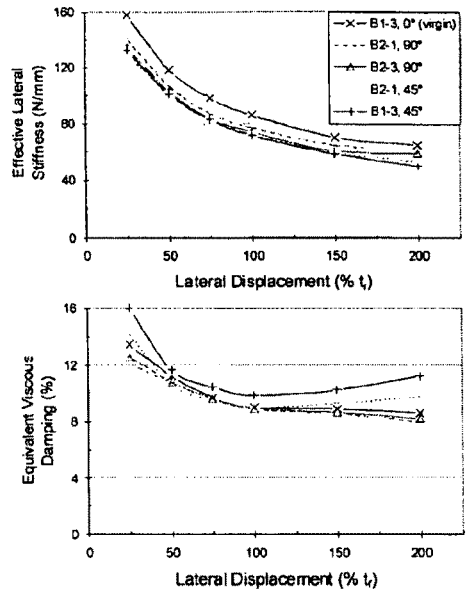
FIG. 19 depicts the lateral response properties of the bearings in lateral cyclic tests with different patterns of displacement amplitude. Values are the average of all cycles at each amplitude level.
Figure 19:
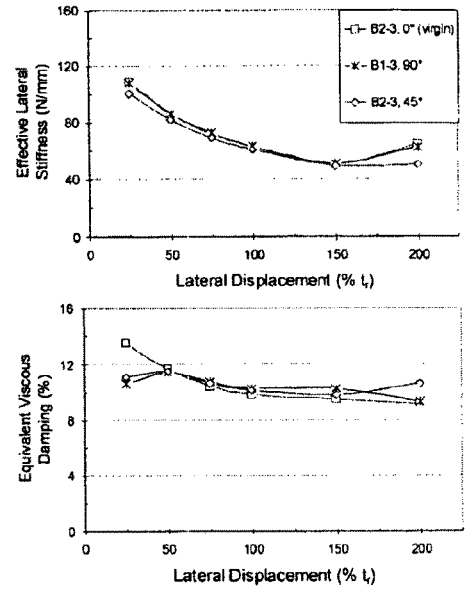

FIGS. 19a and 19b contains the lateral response properties of the bearings discussed above. In general at the 45° orientation, the bearings exhibited a lower effective stiffness in conjunction with a higher effective damping compare to the parallel or perpendicular responses. This suggests that the seismic efficiency of the bearings at a 45° orientation (diagonal direction) may even be superior to the parallel or perpendicular direction. Overall, lateral response to a DA-pattern of displacements, whether at 0°, 90° or 45°, was accompanied with a lower effective stiffness and a higher damping compare to the corresponding response values for AA-pattern of lateral displacements.

The virgin Bearing B1-3 loaded at 0°, provided the upper bound to the effective horizontal stiffness, regardless the orientation of lateral displacements. In the cyclic test with a DA-pattern, whereas Bearing B2-3 was virgin, Bearing B1-3 had been subjected to previously cyclic testing in its transverse direction (see Table 2). Nevertheless, an excellent consistency between the responses of both bearings was achieved. The maximum discrepancy between the average effective horizontal stiffness values of the two bearings was approximately 3%, which occurred at 200% $t_r$ lateral displacement. As seen in FIG. 23b, Bearing B2-3 (at 45° loading) provided the lower bound of the effective horizontal stiffness. Except at the largest amplitude, where the bearings were not completely scragged, this bearing showed good consistency with Bearings B2-3 (at 0° loading) and B1-3 (at 90° loading). In the cyclic test with a DA-pattern of lateral displacements, the resulting effective horizontal stiffnesses were consistent (as the initial cycle had scragged the bearings). As such, so long as no significant damage occurs in the bearings, any discrepancy in the bearings' test results under identical lateral displacement history and test procedure is primarily related to the variation in the unscragged properties of the elastomer. Accordingly, due to the identical material properties, physical geometry, and manufacturing process of the bearings, test observations for the individual bearings (including the virgin bearings) under different lateral displacement histories can be largely extended to all other bearings.

Table 7 contains the upper and lower lateral response bounds of the bearings at 0° or 90° and 45° loading orientations. For the 1.6 MPa vertical design pressure and the values of effective horizontal stiffness given in Table 7, the base isolated period of the ¼ scale bearings for lateral displacements ranging from 25% to 200% $t_r$, depending to the energy magnitude of the earthquake, would range between 0.4 to 0.7 s for the parallel/perpendicular direction. In the diagonal loading direction, the isolated periods would range between 0.5 to 0.8 s. The higher the earthquake energy, the longer would be the base isolated period. It is noted that the corresponding full scale isolated periods would be about double these values.

TABLE 7

Lateral response bounds at parallel/perpendicular and diagonal directions for the tested bearings

| | | Displacement Orientation | | | | | | | |
|---|---|---|---|---|---|---|---|---|---|
| | | Parallel/Perpendicular | | | | Diagonal | | | |
| | | Virgin B1-3, 0° (AA - Pattern) | | B1-3, 90° (DA - Pattern) | | B1-3, 45° (AA - Pattern) | | B2-3, 45° (DA - Pattern) | |
| Displacement Amplitude | Cycle | K (N/mm) | ξ (%) | K (N/mm) | ξ (%) | K (N/mm) | ξ (%) | K (N/mm) | ξ (%) |
| 25% $t_r$ | 1 | 164.0 | 13.7 | 108.5 | 11.2 | 135.7 | 15.8 | 97.9 | 11.0 |
| (4.75 mm) | 2 | 155.6 | 13.4 | 108.0 | 9.8 | 131.5 | 16.1 | 101.1 | 11.5 |
| | 3 | 154.1 | 13.3 | 108.4 | 10.1 | 130.6 | 16.1 | 101.9 | 10.9 |
| 50% $t_r$ | 1 | 123.3 | 11.9 | 86.5 | 11.8 | 102.5 | 12.1 | 81.7 | 11.7 |
| (9.50 mm) | 2 | 116.5 | 10.9 | 85.9 | 11.4 | 101.0 | 11.5 | 81.8 | 11.4 |
| | 3 | 114.6 | 10.8 | 86.2 | 11.1 | 99.9 | 11.4 | 82.0 | 11.3 |
| 75% $t_r$ | 1 | 103.3 | 10.2 | 72.1 | 10.7 | 84.0 | 10.7 | 68.7 | 10.7 |
| (14.25 mm) | 2 | 97.1 | 9.5 | 72.2 | 10.7 | 82.3 | 10.4 | 68.7 | 10.5 |
| | 3 | 95.3 | 9.4 | 72.4 | 10.7 | 81.9 | 10.2 | 68.8 | 10.6 |
| 100% $t_r$ | 1 | 89.3 | 9.4 | 62.5 | 10.6 | 72.3 | 10.2 | 59.8 | 10.2 |
| (19.00 mm) | 2 | 84.7 | 8.8 | 62.8 | 10.1 | 71.3 | 9.7 | 60.6 | 10.1 |
| | 3 | 83.6 | 8.7 | 63.0 | 10.0 | 70.8 | 9.7 | 60.7 | 10.1 |
| 150% $t_r$ | 1 | 72.9 | 9.9 | 50.8 | 10.4 | 58.7 | 10.9 | 49.1 | 9.9 |
| (28.50 mm) | 2 | 68.8 | 8.4 | 50.6 | 10.1 | 57.7 | 10.0 | 49.1 | 9.8 |
| | 3 | 67.1 | 8.3 | 50.9 | 10.1 | 57.1 | 9.8 | 49.4 | 9.6 |
| 200% $t_r$ | 1 | 68.5 | 9.4 | 64.7 | 10.8 | 51.9 | 11.7 | 52.5 | 12.4 |
| (38.00 mm) | 2 | 63.3 | 8.3 | 61.4 | 8.6 | 49.4 | 11.0 | 50.1 | 10.0 |
| | 3 | 61.6 | 8.1 | 60.2 | 8.4 | 48.4 | 10.9 | 48.8 | 9.5 |

AA - Pattern: Lateral displacements with an ascending amplitude pattern.
DA - Pattern: Lateral displacements with a descending amplitude pattern.

Influence of Lateral Displacement Rate

Cyclic lateral testing with an average displacement rate of 30 mm/s was conducted on Bearings B1-1 and B2-1 (at 0° loading). Considering the 1.6 MPa vertical design pressure, the natural frequency of the bearings at 100% $t_r$ (19 mm) lateral displacement was found to be approximately 1.5 Hz from the cyclic test results. This provides an average rate of 114 mm/s for the sinusoidal displacements with 19 mm amplitude in the cyclic lateral testing. This rate was denoted as the "reference rate". As indicated in Table 2, rate sensitivity tests were conducted on the SU-FREI bearings to study the influence of displacement rate on their lateral response. At 1.6 MPa vertical pressure, three cycles of lateral displacements having amplitude of 100% $t_r$ were applied to all of the bearings. The lateral displacements were applied at different average rates of 30, 45, 76, and 114 mm/s.

Table 6 contains results of the rate sensitivity tests. It was found that both the effective horizontal stiffnesses and damping ratios of the bearings increased with the increased displacement rate. However, horizontal stiffness was not as sensitive as damping to the displacement rate. Unlike all other bearings, rate sensitivity tests for Bearing B2-1 started at the highest displacement rate of 114 mm/s and ended at the lowest rate of 30 mm/s. Accordingly, its response appeared to be more sensitive to displacement rate. At average displacement rate of 30 mm/s, a maximum reduction of 10% and 16% in the stiffness and damping of the bearings, respectively, was observed compared to the corresponding values at the reference rate. To work within the test equipment's range of capability, an average displacement rate of 76 mm/s was selected for all of the amplitudes of the cyclic test. At this rate, the influence of rate on the lateral response can be neglected as the effective stiffness and damping were in average 6% and 10% lower than the corresponding values at the reference rate of 114 mm/s (Bearing B2-1 in Table 6).

TABLE 6

Results of rate sensitivity tests at 100% $t_r$ lateral displacements

| Amplitude of lateral displacements = 100% $t_r$ (19 mm) | | Average rate of sinusoidal lateral displacements (mm/s) | | | | | | | |
|---|---|---|---|---|---|---|---|---|---|
| | | 30 | | 45 | | 76 | | 114 | |
| Bearing | | K (kN/mm) | ξ (%) | K (kN/mm) | ξ (%) | K (kN/mm) | ξ (%) | K (kN/mm) | ξ (%) |
| B1-1 | 1st Cycle | 60.9 | 10.2 | 60.6 | 9.7 | 61.2 | 9.9 | 61.5 | 10.1 |
| | Last Cycle | 58.6 | 8.6 | 59.4 | 8.7 | 59.9 | 9.0 | 61.2 | 9.0 |
| B1-3 | 1st Cycle | 66.7 | 10.1 | 66.7 | 10.1 | 68.4 | 10.3 | 69.8 | 11.2 |
| | Last Cycle | 64.2 | 9.3 | 65.5 | 9.4 | 65.9 | 9.6 | 68.3 | 10.3 |
| B2-1 | 1st Cycle | 66.0 | 8.5 | 67.5 | 8.8 | 68.5 | 9.1 | 74.2 | 10.6 |
| | Last Cycle | 65.2 | 7.8 | 66.0 | 8.1 | 67.1 | 8.3 | 70.6 | 8.9 |
| B2-3 | 1st Cycle | 66.4 | 9.5 | 66.2 | 9.4 | 67.7 | 9.7 | 69.7 | 10.0 |
| | Last Cycle | 64.1 | 8.5 | 64.9 | 8.7 | 65.8 | 9.1 | 67.8 | 9.4 |

Figure 24:
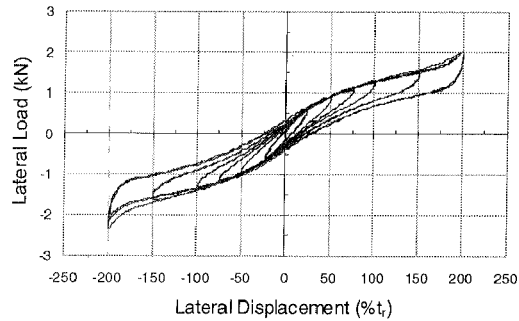
FIG. 24 shows hysteresis loops for repeated cyclic testing of Bearing B1-3.
Figure 24:
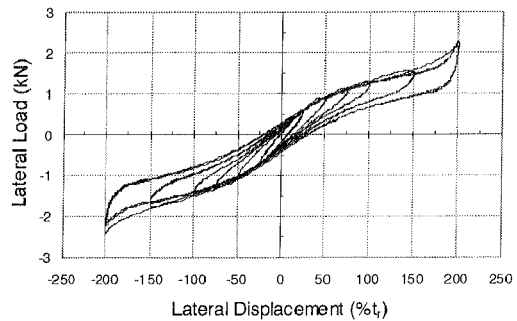

The influence of lateral displacements with identical amplitude history (AA-pattern) but different rate (30 and 76 mm/s), on lateral response of the bearings is shown in FIG. 24. By way of example, only half of the scragged loops at amplitudes 100%, 150%, and 200% $t_r$ are shown in this figure. As can be seen, at the higher rate, the bearings exhibited higher lateral load resisting capacity. This was consistent with observations from the rate sensitivity tests at 100% $t_r$ displacement amplitude.

Influence of Vertical Pressure

To understand the influence of vertical pressure on lateral response, cyclic tests under three different levels of vertical pressure were conducted. The test procedure for each bearing was as follows: the bearing was vertically loaded to the target vertical pressure, next three cycles of fully reversed sinusoidal lateral displacements were applied with a frequency of 1 Hz (implying an average displacement rate of 76 mm/s) and amplitude of 100% $t_r$ (19 mm), and finally the bearing was vertically unloaded. The three prescribed vertical pressures were, 0.8, 1.6, and 2.4 MPa. The upper and lower limits of the applied vertical pressure represent ±50% variation with respect to the design pressure of 1.6 MPa.

Figure 20:
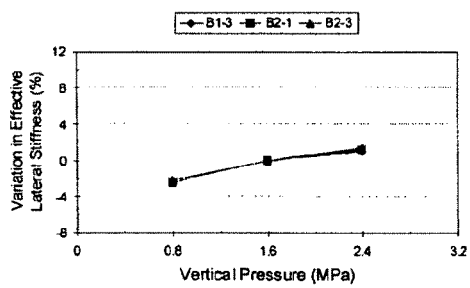
FIG. 20 shows the influence of ±50% variation in the 1.6 MPa vertical design pressure on lateral parallel response of Bearings B1-3, B2-1, and B2-3 (lateral displacement amplitude=100% $t_r$ or 19 mm, displ. rate=76 mm/s).
Figure 20:
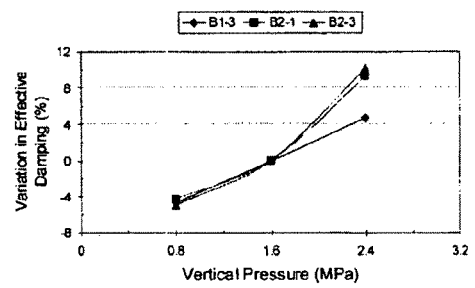

The influence of vertical pressure on effective horizontal stiffness and damping ratio of the bearings can be seen in FIG. 20. Test results showed that both effective horizontal stiffness and effective damping increased with the increased vertical pressure. However, under the investigated vertical pressure range, effective damping was found to be more sensitive to the level of vertical pressure than was the effective horizontal stiffness.

Fiber reinforcement consists of individual fibers grouped into strands and woven into a fabric. The fabric is embedded into a thin polymer matrix to form the fiber reinforcement sheet. Vertical compression of the bearing causes lateral expansion in the bearing and corresponding tension in the fabric which tends to straighten it out. In this regard, the fiber fabric is less rigid in extension than the individual strands which, in turn have lower axial stiffness than the individual fibers. The extent of straightening of the fabric, the strands in the fabric and the fibers in the strand are affected by the level of vertical compression on the bearing. When a SU-FREI bearing is deformed under lateral load, the reinforcement sheets become curved due to the lack of flexural rigidity. Therefore, the internal tension in the curved reinforcement sheet forces the fibers to slip against each other in the strands, and strands to slip against each other in the fabric. Both actions dissipate energy through friction. Thus, the additional damping at higher vertical pressure is attributed to increased internal tension in the fibers, and higher frictional forces during interfacial slippage.

In conventional steel reinforced elastomeric bearings, the steel reinforcement layers are relatively rigid in both extension and flexure. Therefore, they have little influence on the lateral response of the bearing, which is primarily governed by the mechanical properties of the elastomer. However, in FREI bearings, due to tensile extensibility and lack of bending rigidity in fiber fabrics, properties of the reinforcement are involved in the lateral response of the bearing. This involvement is much more pronounced for SU-FREI bearings that exhibit rollover deformation and introduces large curvature in the fabric. Accordingly, any variations in the mechanical properties of the fiber fabric reinforcement affect the lateral response. Results of tensile tests conducted on coupon specimens made from the carbon-reinforcement sheets, showed that up to a certain limit, the effective tensile modulus of fiber reinforcement increased with increasing tensile load. It was found that an increase in the effective horizontal stiffness of the bearings, with increased vertical pressure, was related to the increased effective tensile modulus of the fiber reinforcement. It is understood that the pattern of effective horizontal stiffness increasing with vertical pressure is not expected to continue at high levels of vertical pressure. At some high level of vertical pressure, straightening of the strands in the fabric and the fibers in the strands would have been nearly complete so that any change in the fiber modulus becomes negligible. In such a case, a descending pattern of effective horizontal stiffness with the increasing vertical pressure is expected and the vertical pressure approaches the buckling pressure of the bearings. Similar to an ordinary column, a multilayered elastomeric bearing is susceptible to buckling type of instability. However, the buckling is dominated by low horizontal stiffness of the bearing.

As seen in FIG. 20, the maximum variations in the effective horizontal stiffness and effective damping were approximately 2% and 10%, respectively. Similar cyclic tests at 100% $t_r$ and 150% $t_r$ lateral displacement amplitudes with the lower average displacement rate of 30 mm/s were conducted on Bearing B1-1. Under the prescribed vertical pressure levels, the bearing remained stable and a consistent pattern of increasing horizontal stiffness and damping with increasing vertical pressure was observed. The largest variations occurred at 150% $t_r$ displacement amplitude where, compared to tests at 1.6 MPa vertical pressure, the effective horizontal stiffness decreased by 4% under 1.1 MPa vertical pressure. Under 2.4 MPa vertical pressure, a maximum 10% increase in the effective damping was observed compared to results under 1.6 MPa vertical design pressure.

Vertical Compression Testing

Figure 21:
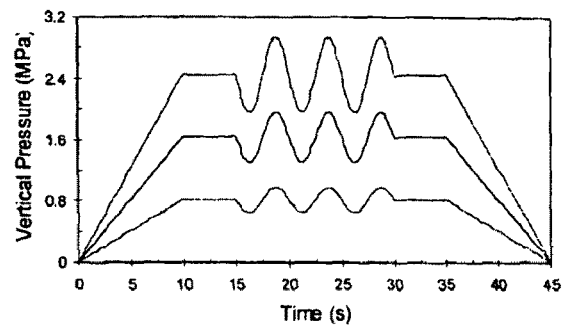
FIG. 21 shows the time history of the input signal utilized for the vertical tests on the bearings of the present invention.

The vertical frequency of an elastomeric bearing is an important design parameter which is directly controlled by the vertical compressive stiffness of the bearing. Vertical testing was conducted to evaluate the corresponding effective vertical stiffness of the bearings under the prescribed levels of vertical pressure. Vertical tests were conducted in a load control manner during which the bearing was monotonically loaded to the target vertical pressure "P". Next, three fully reversed cycles with amplitudes of ±20% "P" were applied and finally the bearing was monotonically unloaded (see FIG. 21). In order to study the influence of vertical pressure on the vertical stiffness, all of the bearings were tested under three specific levels of vertical pressure, namely, 0.82, 1.63, and 2.45 MPa.

Figure 22:
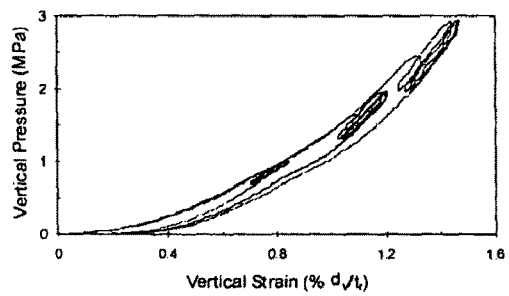
FIG. 22 shows the vertical compressive stress-strain behavior of Bearing B2-3 under 0.8, 1.6, and 2.4 MPa vertical pressure.
Figure 22:
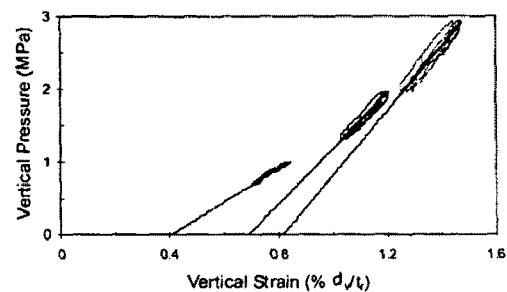

Vertical testing was initially conducted on the virgin Bearings B1-3 and B2-3. As a representative example, the resulting compressive stress-strain curves for Bearing B2-3 at different levels of the vertical pressure are presented in FIG. 22a. The slope of a straight line fitted to the cyclic portion of the curve reflects the effective compressive modulus of the bearing under the specified pressure. FIG. 22b shows that the effective compressive modulus of Bearing B2-3 increased with increasing vertical pressure. The same response behavior was observed for all other bearings tested in this study. Table 8 contains test results for the bearings mentioned above.

TABLE 8

Results of initial vertical test on Bearings B1-3 and B2-3 before lateral cyclic testing

| Bearing | Vertical Load (kN) | Vertical Pressure (MPa) | Vertical Stiffness (kN/mm) | Compressive Modulus (MPa) | Vertical Frequency (Hz) |
|---|---|---|---|---|---|
| B1-3 | 4 | 0.82 | 57.5 | 223.6 | 59.8 |
|  | 8 | 1.63 | 88.1 | 342.4 | 52.3 |
|  | 12 | 2.45 | 111.7 | 434.3 | 48.1 |
| B2-3 | 4 | 0.82 | 59.9 | 232.8 | 61.0 |
|  | 8 | 1.63 | 98.0 | 380.8 | 55.2 |
|  | 12 | 2.45 | 115.0 | 447.1 | 48.8 |

As with conventional steel reinforced elastomeric bearings, the resulting vertical compressive stress-strain curves of the tested fiber reinforced bearings are highly nonlinear with a significant run-in before the full vertical stiffness is developed. This nonlinear response is primarily due to the behavior of the elastomer in compression. The initial run-in depends on several factors including: issues related to workmanship, alignment of the reinforcing layers and, in the case of fiber reinforced bearings, flexibility of the reinforcement in extension. To reduce initial run-in, a special device was designed to apply orthogonal in-plane tension to the bi-directional fabric. Using this setup, the carbon fiber fabric utilized in the construction of the tested bearings was initially (i.e., before bonding to the elastomer layers) stretched in two perpendicular directions. While stretched in tension, an elastomer layer was bonded to one face of the fabric. The fabric maintained in tension until the curing of the bonding compound was completed. Comparing the resulting vertical load-deflection in this example with those of Example 1 indicates that increasing the initial tautness of the fiber reinforcement significantly reduces the initial run-in in the load-deflection response. In general, this initial run-in was determined to be of little concern as long as the bearings develop an adequate level of vertical stiffness under the minimum expected value of the vertical load.

After completing the lateral cyclic loading tests on all of the bearings (see Table 2), vertical testing was performed on Bearings B1-1 and B2-1 and was repeated on Bearings B1-3 and B2-3. The main objective was to examine the vertical performance of bearings that had already been exposed to extreme lateral displacements. Except for Bearing B1-1, no damage was visible on the other tested bearings. Table 9 summarizes the test outcomes where, compared to results from tests prior to lateral loading compiled in Table 8, maximum 10% and 12% decreases in the vertical stiffness of the bearings at 1.6 MPa and 2.4 MPa vertical pressure, respectively, were observed. These small changes document acceptably small damage to the bearings where, after a major earthquake event, no serious serviceability issues would exist regarding the vertical performance of the bearings. After completion of the vertical tests, no debonding in the bearings was observed through visual inspection.

TABLE 9

Results of vertical test on Bearings B1-1, B1-3, B2-1, and B2-3 after lateral cyclic testing

| Bearing | Vertical Load (kN) | Vertical Pressure (MPa) | Vertical Stiffness (kN/mm) | Compressive Modulus (MPa) | Vertical Frequency (Hz) |
|---|---|---|---|---|---|
| B1-1* | 4 | 0.82 | 50.0 | 194.4 | 55.7 |
|  | 8 | 1.63 | 72.2 | 280.7 | 47.4 |
|  | 12 | 2.45 | 85.9 | 334.0 | 42.2 |

TABLE 9-continued

Results of vertical test on Bearings B1-1, B1-3, B2-1, and B2-3 after lateral cyclic testing

| Bearing | Vertical Load (kN) | Vertical Pressure (MPa) | Vertical Stiffness (kN/mm) | Compressive Modulus (MPa) | Vertical Frequency (Hz) |
|---------|--------------------|-----------------------|---------------------------|---------------------------|------------------------|
| B1-3    | 4                  | 0.82                  | 56.2                      | 218.5                     | 59.1                   |
|         | 8                  | 1.63                  | 79.5                      | 309.1                     | 49.7                   |
|         | 12                 | 2.45                  | 98.2                      | 381.8                     | 45.1                   |
| B2-1    | 4                  | 0.82                  | 53.9                      | 209.6                     | 57.9                   |
|         | 8                  | 1.63                  | 81.7                      | 317.6                     | 50.4                   |
|         | 12                 | 2.45                  | 105.3                     | 409.4                     | 46.7                   |
| B2-3    | 4                  | 0.82                  | 58.0                      | 225.5                     | 60.0                   |
|         | 8                  | 1.63                  | 95.6                      | 371.7                     | 54.5                   |
|         | 12                 | 2.45                  | 112.3                     | 436.6                     | 48.2                   |

*Bearing B1-1 showed the lowest stiffness due to partial debonding in one of its laminates after completion of lateral cyclic test at 45°.

The vertical stiffness of elastomeric bearings is usually several hundred times larger than the effective horizontal stiffness of the bearing. This is to ensure that rocking vibration modes are prevented from participating in the response of the base isolated building. According to Tables 3 and 4, the bearings exhibited vertical frequencies ranging from 42 Hz to 64 Hz, depending on the level of the vertical compression. These values are significantly higher than the target lateral isolated frequency range of the ¼ scale bearings (2 Hz or less). Accordingly, the vertical performance of the bearings is considered quite satisfactory.

Repeatability of the Lateral Response

Figure 23:
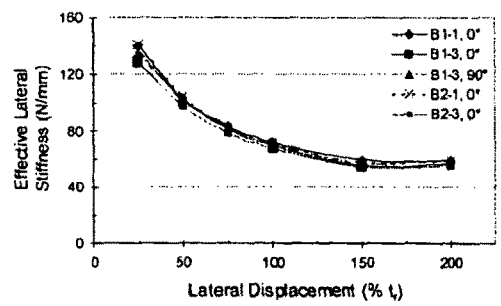
FIG. 23 shows the lateral response characteristics of bearings in the repeated cyclic testing. Response values are the average of all cycles at each level of lateral displacement amplitude.
Figure 23:
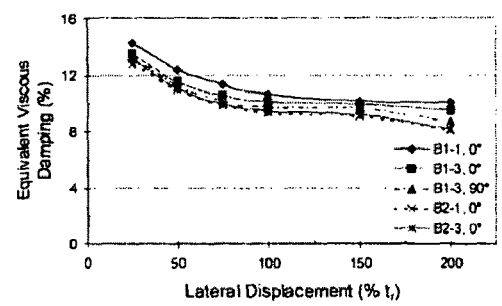

After completion of the entire test program assigned for each bearing (see Table 2), lateral cyclic testing, with the displacement history shown in FIG. 14a, was repeated for all of the bearings. The main objective was to evaluate the overall lateral response characteristics and the mechanical properties of the bearings that were previously subjected to large lateral displacements at 0°, 90°, and 45° directions. All bearings were retested at 0° orientation and Bearing B1-3 was also tested at 90°. FIG. 23 shows the lateral response properties versus amplitudes of lateral displacement. The observed trends were similar to those of the virgin bearings (see FIG. 19a). Close agreement in the response of the tested bearings once again suggests that any variation in the virgin response of the bearings is primarily related to the unscragged configuration of the rubber. Once the bearings are scragged, variation in the lateral response becomes negligible.

Figure 25:
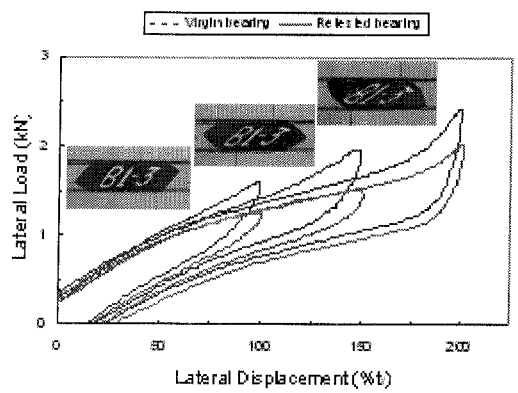
FIG. 25 shows retest versus virgin response of Bearing B1-3 under cyclic lateral displacements at 0°.
Figure 25:
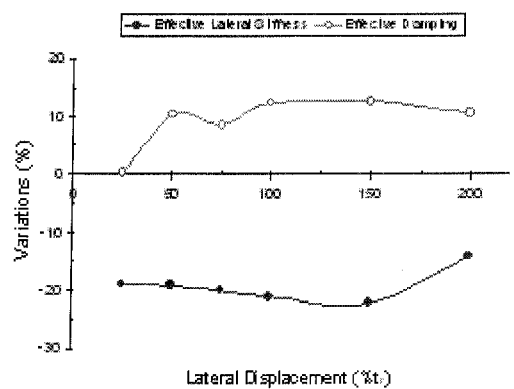

As a typical plot, hysteresis loops corresponding to all cycles of the test on Bearing B1-3 (at 0° orientation) are shown in FIG. 23a. Unlike the previous set of cyclic tests, no significant differences were observed in the responses during the first cycle and the subsequent cycles at each level of displacement amplitude. This is not surprising since the bearing was already scragged. However, as opposed to the behavior shown in FIG. 14b for unscragged bearings, no significant stiffening occurred at the extreme portion of lateral cycles except at the largest lateral displacement amplitude of 200% $t_r$ which was also the largest previously applied displacement. This can be seen in FIG. 25a, where, the scragged half-cycle loops of Bearing B1-3 (at 0° orientation) are plotted along with the corresponding scragged response of the same bearing at its virgin configuration (Bearing B1-3, at 0° in FIG. 14b). It is postulated that the large lateral displacements in the 90° and 45° directions resulted in more breakage in the weaker crosslinks of the elastomer and, in turn, this influenced the lateral response at 0° orientation in the repeated cyclic tests. As shown in FIG. 25b, retested Bearing B1-3 showed lower effective horizontal stiffness and higher effective damping relative to its virgin response. At 150% $t_r$ lateral displacement, the maximum variation in the average response was observed with 22% decrease in stiffness and less than 13% increase in the effective damping. Despite the stiffness degradation, all of the bearings remained stable with no negative or zero instantaneous tangent stiffness in the loading branch of the hysteresis loops (see FIG. 24). As such, the lateral performance of the bearings, even after previously experiencing large lateral displacements at 0°, 90°, and 45° orientations, was deemed to be quite satisfactory.

No significant damage was observed after completing the initial set of cyclic testing (except for Bearing B1-1 that acquired partial debonding in one of its laminates during the diagonal cyclic testing). After completing the repeated cyclic testing, no new damage was visible in Bearing B1-1, and no debonding in the other bearings was visible. Additionally, consistent response of the bearings and the repeatability of the hysteresis loops during cycles with constant amplitude suggested that if any unobserved internal delamination had occurred in the bearings, it had negligible influence on bearing behavior. Thereby, the resulting softening in the bearings' response, compared to their original response, is thought to have occurred from the Mullin's effect in the elastomer. Mullin's effect attributes to strength degradation feature of an elastomer compound in the subsequent cycles of loading with respect to the first load cycle. Since no vertical tension is developed in a laterally deformed SU-FREI bearing, internal bonding between elastomer and reinforcement sheets are subjected to a much lower demand compared to the same bearing in a bonded application. Accordingly, a SU-FREI is able to survive multiple cycles of large amplitude lateral displacements.

A close examination of FIGS. 19b and 23a shows that, except at the largest displacement amplitude (200% $t_r$), Bearings B1-3, B2-1, and B2-3 exhibited larger effective horizontal stiffness in the repeated cyclic testing than in the cyclic testing with descending amplitudes. This is another indication that no significant damage was done to these bearings even when the repeated cyclic tests were performed. Since both FIGS. 19b and 23a present the scragged properties of the bearings, the lower stiffness values in FIG. 19b imply that there is an influence of lateral displacement history on the bearings response even if they were already scragged. It appears that cyclic lateral displacements with a descending amplitude pattern produce lower bound results for the effective horizontal stiffness and perhaps an acceptable estimate of the upper bound for the effective damping of the bearings.

Extreme Lateral Response

The full contact vertical face lateral displacement ($\delta_{fc}$) is defined as the point when the originally vertical faces of the bearings completely contact the upper and lower platens of the test machine. The lateral displacement capacity ($\delta_{max}$) is reached when, due to rollout instability, the bearing's lateral load displacement hysteresis behavior exhibits softening behavior with negative tangential stiffness. For SU-FREI bearings that exhibit SR-deformation in an unbonded application, $\delta_{max}$ is significantly larger than $\delta_{fc}$ provided that no significant damage occurs in the bearing. In order to acquire insight into the lateral displacements $\delta_{fc}$ and $\delta_{max}$ and the extreme lateral response behavior of the bearings, Bearing TB1 was constructed with the same characteristics of the previous bearings but with a different width. This bearing had a 70×41 mm physical dimensions in plan, a total thickness of approximately 25 mm and total thickness of the Neoprene layers $t_r$=19 mm. This bearing had an aspect ratio of R=2.8 along its longitudinal direction. The shape factor for the bearing, due to a reduced width, was S=8.2. Unlike all of the previous bearings, no finishing coats of the bonding compound were applied to the perimeter surfaces of this bearing as there was an interest in studying the role of finishing coats on damage protection of the bearing at large lateral displacements.

Figure 26:
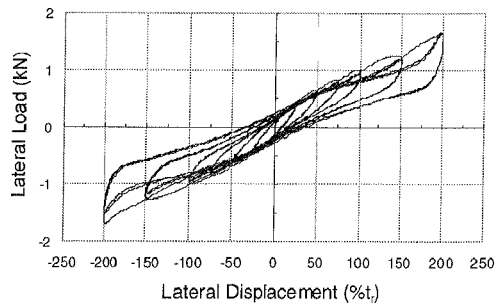
FIG. 26 shows the longitudinal lateral response of the virgin Bearing TB1 under constant 1.6 MPa vertical pressure at lateral displacement ranges: 25%, 50%, 75%, 100%, 150%, and 200% $t_r$, and displacement rate=76 mm/s.
Figure 27:
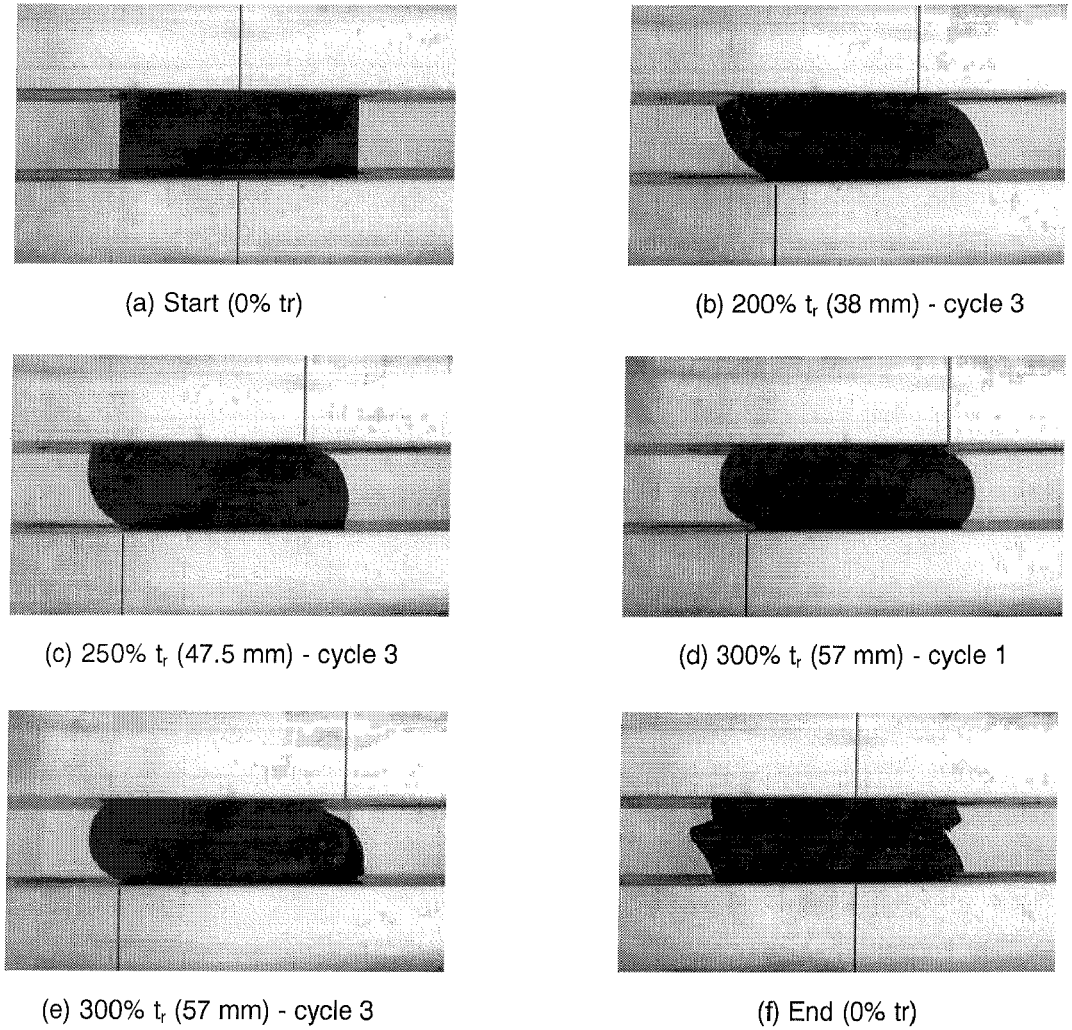
FIG. 27 shows photographs of Bearing TB1 taken during lateral cyclic testing. No bonding finishing coats were applied to the perimeter surfaces of this bearing.

FIG. 26 contains the lateral load-displacement hysteresis loops for all cycles of the cyclic test on the virgin Bearing TB1 laterally loaded in its longitudinal direction. Under a constant 1.6 MPa vertical pressure, the bearing was subjected to the displacement history of FIG. 14a. As seen in FIG. 26, the bearing exhibited an acceptable SR-deformation. No delamination or any other damage was visible in the bearing after completion of this cyclic testing. This implied that lateral displacements up to 200% $t_r$ were safely accommodated by the bearing even in the absence of the finishing coats. Observations from all cyclic testing previously conducted in this study implied that $\delta_{fc}$ was larger than the 200% $t_r$ lateral displacement amplitude. As shown in FIG. 27b, the original vertical faces of the bearings did not completely meet the upper and lower platens at the 200% $t_r$ lateral displacement.

Figure 28:
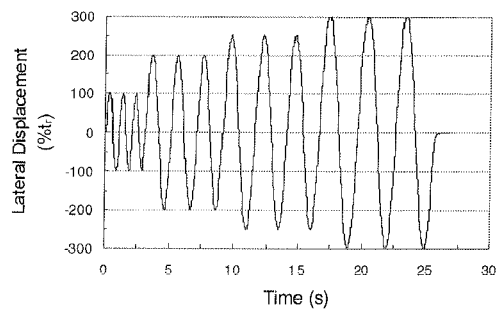
FIG. 28 shows the longitudinal lateral response for Bearing TB1 (p=1.6 MPa, lateral displ. ranges: 100%, 200%, 250%, and 300% $t_r$, displ. rate=76 mm/s).
Figure 28:
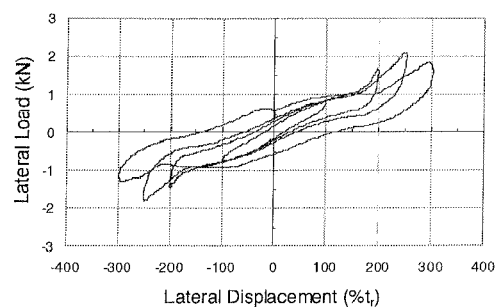

To study the ultimate response of the bearing, the displacement time history shown in FIG. 28a with four displacement amplitudes, was applied to the bearing while a vertical pressure of 1.6 MPa was maintained. Having been previously scragged, no significant unscragged properties were observed up to amplitude of 200% $t_r$. However, during the first cycle of each 250% and 300% $t_r$ displacement amplitude, the bearing showed larger effective horizontal stiffness and damping during than the following cycles. This is considered to be due to Mullin's effect.

FIG. 28b shows the hysteresis loops for the last cycle of each displacement amplitude where positive incremental lateral load-resisting capacity versus displacement was observed for the 250% $t_r$ (47.5 mm) displacement amplitude. This displacement amplitude corresponds to $\delta_{fc}$ (see FIG. 27c). The bearing showed acceptable SR-deformation during the first 2 cycles of 300% $t_r$ (57 mm) amplitude. However, the hysteresis loop for the final cycle of the test showed significant stiffness degradation as a result of a major delamination localized in one of the bearing's laminates (see FIG. 27f). As seen in FIG. 28b, the hysteresis loop at the largest lateral displacement exhibited approximately zero tangent stiffness (at positive amplitudes) and even some softening behavior (at negative amplitudes) which were followed by a stiffening behavior at the largest level of lateral displacement. The stiffening behavior at the extreme portion of 300% $t_r$ lateral displacement cycle implied that the line of action of the resultant vertical load had not reached the edge of the bearing's contact surface. Accordingly, if the localized delamination in the bearing had not occurred, the bearing would have remained stable for lateral displacements exceeding 300% $t_r$. Despite this, for Bearing TB1 $\delta_{max}$ is conservatively considered to be as low as $\delta_{fc}$=250% $t_r$. As shown in FIG. 27f, at the end of the last test cycle, the bearing had slipped approximately 6 mm in the direction of the input displacement, with respect to its original position. This is 10.5% of the 300% $t_r$ lateral displacement amplitude.

Testing on Bearing TB1 provided insight into the extreme lateral response of such bearings. Unlike Bearing TB1, the lateral faces of all other bearings were covered with 2 coats of the bonding compound. Therefore, based on the above test results, these bearings are expected to safely sustain a 250% $t_r$ (47.5 mm) lateral displacement amplitude. For a larger lateral displacement demand, the bearing's design specifications could be consistently altered in order to meet the desired maximum lateral displacement. In some practical cases, even if the bearings' lateral displacement capacity meets the extreme design expectations, special protectors may be utilized to prevent the superstructure from experiencing any unanticipated excessive displacements at the bearings. This would depend on the importance of the structure and is a precaution employed in application of conventional base isolators.

Summary of Example 3

Four ¼ scale square FREI bearings were experimentally studied under various test sequences in this research program. The test bearings were employed in an unbonded application. The test results showed that this application maximized the efficiency of the bearings as seismic isolators. Response characteristics of the tested SU-FREI bearings were found to be similar to those of conventional steel reinforced high-damped rubber bearings in the sense of changes in the effective horizontal stiffness and damping with change in the amplitude of displacement even though an unfilled elastomer was utilized.

In general, the lateral response of the SU-FREI bearings was found to be highly nonlinear with some sensitivity to the amplitude, amplitude history and rate of the cyclic lateral displacements imposed to the bearings, and to the level of vertical pressure on the bearings. Additionally, the transition between virgin and scragged properties of the elastomer, adds to the complexity of the response.

Lateral Displacement Amplitude:

Advantageously, the effective horizontal stiffness of the bearings decreased significantly (approximately 60%) with increasing amplitude of lateral displacements. The equivalent viscous damping ratios of the bearings also decreased with increasing lateral displacement amplitude. However, sufficient damping (minimum 8%) was achieved at the extreme lateral displacements.

Lateral Displacement Amplitude History:

The shape of hysteresis loops was highly influenced by the history of the input lateral displacements. The virgin bearings that were subjected to displacement histories with an ascending pattern of amplitude exhibited unscragged response properties during the first cycle of each displacement amplitude. The maximum differences between the scragged and unscragged response values were observed at amplitudes larger than 150% $t_r$. The unscragged effective horizontal stiffness and damping values were at most 10% and 19%, respectively, larger than the average response value of the scragged (stable) loops (virgin Bearing B1-3, 0° in Table 7). The minimum values of the effective horizontal stiffness and the maximum effective damping ratio occurred when the bearings were subjected to a descending pattern of displacement amplitude. Such a lateral displacement history resulted in a maximum of 27% decrease in effective horizontal stiffness and 15% increase in the effective damping compare to the average response of the corresponding virgin bearing against an ascending amplitude of lateral displacement history. This is shown when comparing the responses of the virgin Bearing B1-3, 0° and Bearing B1-3, 90° at 150% $t_r$ in Table 7.

Lateral Displacement Rate:

Lateral response properties were found to be increased with increasing displacement rate. Test results showed that effective damping was more sensitive to the lateral displacement rate than was the effective horizontal stiffness. However, since the bearings were tested at an adequate average displacement rate which was sufficiently close to the actual operating average rate of the bearings, the influence of rate on the obtained response values can be neglected.

Vertical Pressure:

influence of ±50% variation in the 1.6 MPa vertical design pressure on the effective horizontal stiffness was found to be negligible. This implied that the prescribed values of vertical pressure were sufficiently below the buckling load of the bearings. However, the effective damping was found to be more influenced by variations in the vertical pressure. A 50% increase in the vertical pressure resulted in a 10% increase in the effective damping. For many practical cases this variation can be neglected from an engineering perspective.

For many practical applications, by neglecting the influences of lateral displacement rate and the vertical pressure on the lateral response of the bearings, the hysteresis loops corresponding to the cyclic testing with ascending and descending amplitude patterns indicate the bounds of the bearing's lateral response.

Vertical compression testing revealed that the SU-FREI bearings tested in this example had an acceptable vertical stiffness. Depending on the level of vertical load, the resulting vertical frequencies ranged from 42 to 64 Hz. The minimum achieved vertical frequency of around 40 Hz in the ¼ scale bearings represents a value of 20 Hz in the corresponding full scale bearings. This value is sufficient as it is significantly larger than the target isolated frequency of the full scale SU-FREI bearings (i.e., 0.63 to 1.25 Hz). After conducting the lateral test program, subsequent lateral tests showed that the vertical stiffness degradation of the bearings was negligible.

At $\delta_{fc}$=250% $t_r$ (47.5 mm), the originally vertical faces of the bearings were expected to completely contact the upper and lower supports. For SU-FREI bearings that remain undamaged under large lateral displacements, the lateral displacement at rollout instability (lateral displacement capacity $\delta_{max}$) is expected to be significantly larger than $\delta_{fc}$. All of the bearings showed SR deformation during the original cyclic testing in the 0°, 90°, and 45° directions and during the repeated cyclic test in the 0° direction. Consistent lateral response of the scragged bearings implied that any significant discrepancy in the virgin response of the bearings resulted from unscragged properties of the elastomer. Cyclic testing did not result in any significant damage to the bearings (except Bearing B1-1). This is evidence of the reliability of the bearings.

Considering the lower and upper limits of the calculated base isolated periods for the tested ¼ scale bearings, the isolated periods for the corresponding full scale model of the bearings would range from 0.8 to 1.4 s in the parallel/perpendicular direction, and 1 to 1.6 s in the diagonal direction. Additionally, the corresponding lateral displacement capacity would be 190 mm (250% $t_r$) in conjunction with sufficient damping (8% and higher). Therefore, the corresponding full scale bearings can be effectively used for hazard mitigation of many structures, including but not limited to, low-rise buildings, with fixed base period of 0.1 to 0.2 s, located in moderate to high seismic regions worldwide.

Alteration of Shapes

Stable rollover is achieved by proper dimensioning of isolator bearings (200) supported within flat contact surfaces (205) and (210), as shown in FIG. 29a. Here, the vertical faces (215) have a straight edge, and are perpendicular to the contact surfaces (205) and (210). Other shapes of bearings are contemplated in the present invention. As shown in FIG. 29b, the vertical faces (225) of the bearing (220) can be shaped to improve the bearing's lateral response, and accelerate, delay, or modify the stiffening effect at the extreme stage of lateral deformation following the stable rollover behaviour. Similarly, as shown in FIG. 29c, the vertical faces (235) of the bearing (230) are shaped to perform the same function as in FIG. 29b. In addition, as shown in FIGS. 29d and 29e, the surrounding contact surfaces ((240) and (245) above and below the rectangular bearing (200) can be shaped to improve the bearing's lateral response and to accelerate, delay, or modify the stiffening effect at the extreme stage of lateral deformation following the stable rollover behaviour. Finally, FIGS. 29f and 29g show how the vertical faces of the rectangular bearing (200) can be fitted with preformed shapes (260) and (265) to improve the bearing's lateral response and to accelerate or delay the stiffening effect at the extreme stage of lateral deformation. There are numerous possible shapes that can be used depending on specific criteria related to changing the fundamental period of the bearing, changing clamping, and "designing-in" the type of stiffening required for stable rollover.

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. An elastomeric seismic isolator bearing in contact with, but not bonded to, a structure and a foundation, said bearing comprising a plurality of elastomeric layers of total thickness $t_r$, said elastomer layers being reinforced with and bonded to a plurality of fiber layers, said bearing including a top face, a bottom face and at least two side faces between the top and bottom faces, wherein in a first non-deformed state, in which no lateral load is applied to the structure or the foundation, the top face is completely in contact with a first surface part of the structure, the bottom face is completely in contact with a first surface part of the foundation and the side faces are not in contact with either the structure or the foundation; and in a second deformed state, in which a lateral load applied to the structure or the foundation causes a bearing displacement of about 200% $t_r$, one side face is completely in contact with a second surface part of the structure and another side face is completely in contact with a second surface part of the foundation, said top face being substantially smaller than the entire structure surface, said bearing remaining in stable support of the structure in both states.

2. The elastomeric seismic isolator bearing of claim 1, wherein said elastomeric layers comprise one or more unfilled elastomers.

3. The elastomeric seismic isolator bearing of claim 1, wherein said elastomeric layers comprise one or more filled elastomers.

4. The elastomeric seismic isolator bearing of claim 1, wherein said elastomeric layers comprise an elastomer having a hardness of between 30-60 Durometer Shore A.

5. The elastomeric seismic isolator bearing of claim 1, wherein said elastomeric layers comprise an elastomer having a damping of between 2% to 20%.

6. The elastomeric seismic isolator bearing of claim 1, wherein said elastomeric layers comprise an elastomer selected from the group consisting of natural gum rubber, neoprene, butyl rubber and urethanes.

7. The elastomeric seismic isolator bearing of claim 6, wherein said elastomer is natural gum rubber or neoprene.

8. The elastomeric seismic isolator bearing of claim 1, wherein said plurality of fiber layers comprise a bi-directional fabric, a tri-directional fabric or alternating unidirectional fabrics with perpendicular orientation.

9. The elastomeric seismic isolator bearing of claim 8, wherein said fiber layers comprise woven carbon fiber, nylon, para-aramid synthetic fiber or aramid fiber.

10. The elastomeric seismic isolator bearing of claim 9, wherein said fiber layers comprise bi-directional woven carbon fiber.

11. The elastomeric seismic isolator bearing of claim 1, wherein said fiber layers have a fiber to matrix volume fraction of between 30% to 70%.

12. The elastomeric seismic isolator bearing of claim 1, wherein one or more of said elastomeric layers is bonded to one or more of said fiber layers using a hot or cold vulcanization process, adhesive or other mechanical bonding process.

13. The elastomeric seismic isolator bearing of claim 12, wherein one or more of said elastomeric layers is bonded to one or more of said fiber layers using a cold vulcanization or mechanical bonding process.

14. The elastomeric seismic isolator bearing of claim 1, wherein said bearing has a shape factor of between 5 to 25, and an aspect ratio of at least 2.

15. The elastomeric seismic isolator bearing of claim 1, wherein said bearing has a fiber to elastomer volume fraction of at least 5%.

16. The elastomeric seismic isolator bearing of claim 1, wherein said two or more faces are chosen from the group consisting of vertical faces and modified vertical faces.

17. The elastomeric seismic isolator bearing of claim 1, wherein said at least two faces are vertical faces fitted with preformed attachments.

18. The elastomeric seismic isolator bearing of claim 1, wherein a first contact surface of a structure is in contact with said bearing from above; a second contact surface of the structure is in contact with said bearing from below; said first and second contact surfaces each having a modified shape.

19. The elastomeric seismic isolator bearing of claim 1, wherein said bearing has a seismic isolation period of at least 1 second.

20. The elastomeric seismic isolator bearing of claim 1 wherein the plurality of elastomeric layers reinforced with and bonded to the plurality of fiber layers comprises a plurality of neoprene layers interspersed with a plurality of bi-directional carbon fiber layers.

21. The elastomeric seismic isolator bearing of claim 20, wherein one or more of said neoprene layers is bonded to one or more of said bi-directional carbon fiber layers using a cold vulcanization or mechanical bonding process.

22. The elastomeric seismic isolator bearing of claim 20, wherein said bearing has a shape factor of between 5 to 25; an aspect ratio of at least 2; and a fiber to elastomer volume fraction of at least 5%.

23. The elastomeric seismic isolator bearing of claim 20, wherein said bearing has a seismic isolation period of at least 1 second.

24. Use of one or more elastomeric seismic isolator bearings of claim 23 comprising the steps of:
    a. determining said structure's fixed base period; and
    b. contacting said one or more bearings with said structure for seismic mitigation,
    wherein said structure has a fixed base period of between 0.1 to 0.5 seconds.

25. An elastomeric seismic isolator bearing in contact with, but not bonded to, a structure and a foundation, said bearing comprising a plurality of natural gum rubber layers of total thickness $t_r$, said natural gum rubber layers interspersed with and bonded to a plurality of bi-directional carbon
    in a first non-deformed state, in which no lateral load is applied to the structure or the foundation, the top face is completely in contact with a first surface part of the structure, the bottom face is completely in contact with a first surface part of the foundation and the side faces are not in contact with either the structure or the foundation; and
    in a second deformed state, in which a lateral load applied to the structure or the foundation causes a bearing displacement of about 200% $t_r$, one side face is completely in contact with a second surface part of the structure and another side face is completely in contact with a second surface part of the foundation,
    said top face being substantially smaller than the entire structure surface, said bearing remaining in stable support of the structure in both states.

26. The elastomeric seismic isolator bearing of claim 25, wherein one or more of said natural gum rubber layers is bonded to one or more of said bi-directional carbon fiber layers using a cold vulcanization or mechanical bonding process.

27. The elastomeric seismic isolator bearing of claim 25, wherein said bearing has a shape factor of between 5 to 25; an aspect ratio of at least 2; and a fiber to elastomer volume fraction of at least 5%.

28. The elastomeric seismic isolator bearing of claim 25, wherein said bearing has a seismic isolation period of at least 1 second.

29. Use of one or more elastomeric seismic isolator bearings of claim 28 comprising the steps of:
    a. determining said structure's fixed base period; and
    b. contacting said one or more bearings with said structure for seismic mitigation,
    wherein said structure has a fixed base period of between 0.1 to 0.5 seconds.

* * * * *

UNITED STATES PATENT AND TRADEMARK OFFICE
CERTIFICATE OF CORRECTION

| | |
|---|---|
| PATENT NO. | : 8,291,651 B2 |
| APPLICATION NO. | : 12/663143 |
| DATED | : October 23, 2012 |
| INVENTOR(S) | : Robert Drysdale et al. |

It is certified that error appears in the above-identified patent and that said Letters Patent is hereby corrected as shown below:

Please correct the following:

In the Claims:

Column 42, line 19,

"and bonded to a plurality of bi-directional carbon" should read
--and bonded to a plurality of bi-directional carbon fiber layers, said bearing including a top face, a bottom face and at least two side faces between the top and bottom faces, wherein--

Signed and Sealed this
Twenty-third Day of April, 2013

Teresa Stanek Rea
*Acting Director of the United States Patent and Trademark Office*